(12) United States Patent
Puri et al.

(10) Patent No.: US 12,401,999 B2
(45) Date of Patent: Aug. 26, 2025

(54) RF AWARE DEEP LEARNING AUTHENTICATION SOLUTION

(71) Applicants: Manoj Puri, Fremont, CA (US); Raul Puri, Fremont, CA (US); Rishi Puri, Fremont, CA (US); Manish Puri, Fremont, CA (US)

(72) Inventors: Manoj Puri, Fremont, CA (US); Raul Puri, Fremont, CA (US); Rishi Puri, Fremont, CA (US); Manish Puri, Fremont, CA (US)

( * ) Notice: Subject to any disclaimer, the term of this patent is extended or adjusted under 35 U.S.C. 154(b) by 409 days.

(21) Appl. No.: 17/595,707

(22) PCT Filed: May 25, 2020

(86) PCT No.: PCT/US2020/034454
§ 371 (c)(1),
(2) Date: Nov. 23, 2021

(87) PCT Pub. No.: WO2020/243042
PCT Pub. Date: Dec. 3, 2020

(65) Prior Publication Data
US 2022/0256341 A1    Aug. 11, 2022

Related U.S. Application Data

(60) Provisional application No. 62/852,673, filed on May 24, 2019.

(51) Int. Cl.
*H04W 12/06* (2021.01)
*G06F 21/62* (2013.01)
(Continued)

(52) U.S. Cl.
CPC ........ *H04W 12/06* (2013.01); *G06F 21/6245* (2013.01); *H04L 9/008* (2013.01);
(Continued)

(58) Field of Classification Search
CPC ..... H04W 12/06; H04W 12/03; H04W 12/69; G06F 21/6245; H04L 9/008; H04L 9/3297; H04L 2209/80
(Continued)

(56) References Cited

U.S. PATENT DOCUMENTS 9,367,822 B2 * 6/2016 Shipon ................... G06Q 10/00
10,984,314 B1 * 4/2021 Chelian .................. G06N 20/00
(Continued)

OTHER PUBLICATIONS

International Search Report for PCT/US2020/034454 dated Aug. 25, 2020 (PCT/ISA/210).
(Continued)

*Primary Examiner* — Don N Vo
(74) *Attorney, Agent, or Firm* — Sughrue Mion, PLLC

(57) ABSTRACT

A system for authenticating a wireless device. The device comprises an RF feature extractor operable to extract RF features related to a plurality of wireless devices. A deep learning engine is provided which is operable to learn the RF features evaluates RF features related to the plurality of devices. The RF extractor is operable to further receive RF features of a new instance of a specific wireless device from the plurality of devices. An analyzer is operable to detect a signature for the specific wireless device using the RF characteristics about the new instance using the deep learning engine.

34 Claims, 21 Drawing Sheets

(51) Int. Cl.
  *H04L 9/00*   (2022.01)
  *H04L 9/32*   (2006.01)
  *H04W 12/03*  (2021.01)
  *H04W 12/69*  (2021.01)

(52) U.S. Cl.
  CPC ........... *H04L 9/3297* (2013.01); *H04W 12/03* (2021.01); *H04W 12/69* (2021.01)

(58) Field of Classification Search
  USPC ........................................................ 455/411
  See application file for complete search history.

(56) References Cited

U.S. PATENT DOCUMENTS

| | | | |
|---|---|---|---|
| 2007/0025245 A1* | 2/2007 | Porras | H04W 99/00 370/252 |
| 2008/0043814 A1 | 2/2008 | Moffatt | |
| 2015/0172289 A1* | 6/2015 | Kwon | H04W 12/122 726/3 |
| 2018/0204111 A1 | 7/2018 | Zadeh et al. | |
| 2019/0044949 A1 | 2/2019 | Bartfai-Walcott et al. | |
| 2019/0087689 A1* | 3/2019 | Chen | H04L 9/0825 |
| 2019/0277957 A1* | 9/2019 | Chandrasekhar | G01S 5/017 |
| 2019/0279005 A1* | 9/2019 | Ogale | G05D 1/0221 |
| 2020/0027002 A1* | 1/2020 | Hickson | G06N 3/088 |
| 2020/0053559 A1* | 2/2020 | Kim | G06F 18/24 |
| 2020/0252412 A1* | 8/2020 | Prasad Koppisetti | G06N 3/08 |
| 2020/0382961 A1* | 12/2020 | Shattil | H04L 43/18 |

OTHER PUBLICATIONS

Written Opinion for PCT/US2020/034454 dated Aug. 25, 2020 (PCT/ISA/237).

\* cited by examiner

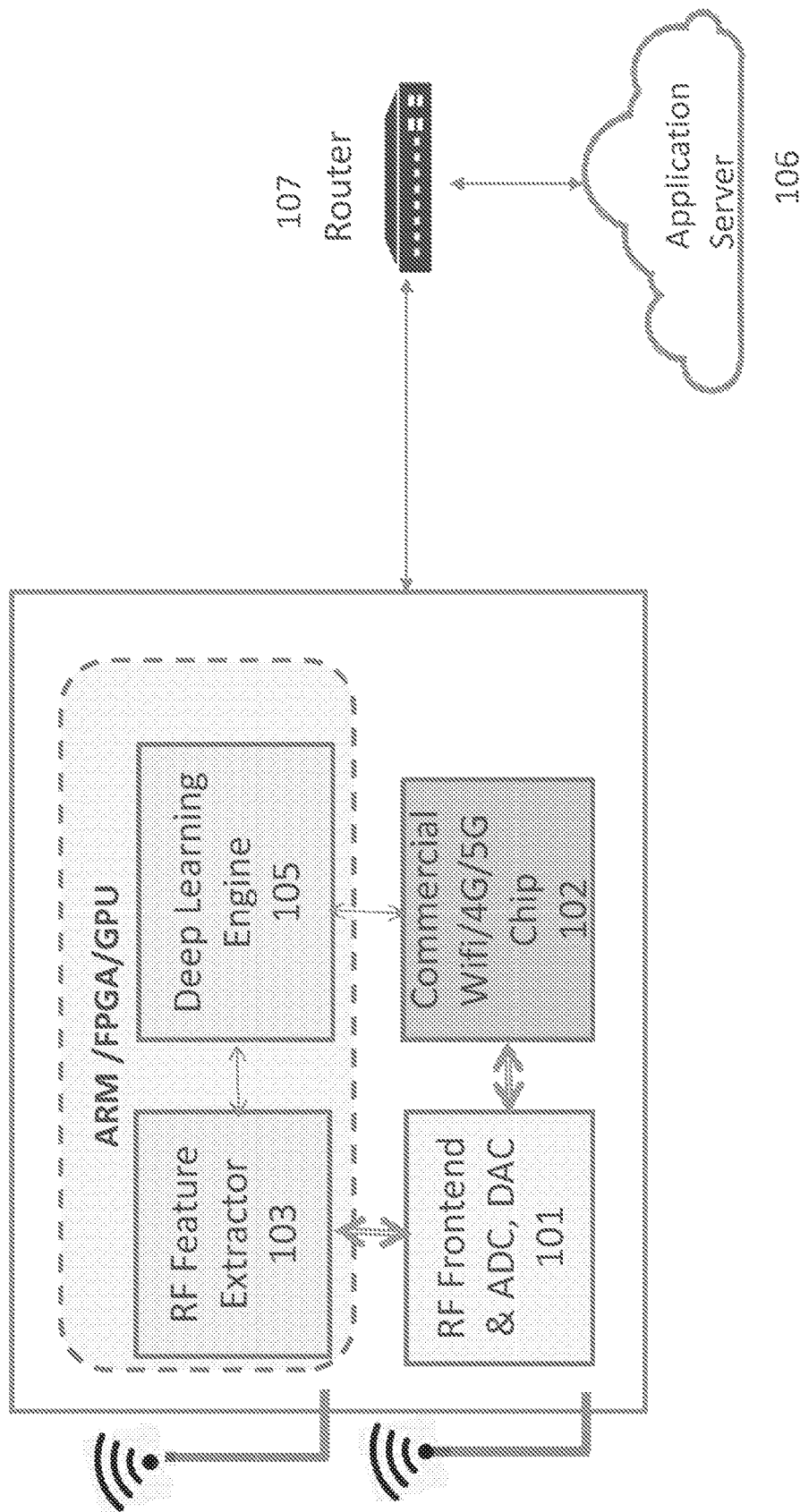

FIG 7

- Number of devices D
- Each epoch has B mini-batch of size J
- For l =1 to B
  - Sample $\mathcal{D}_{Ti} = \{\mathcal{X}_{si}, \mathcal{Y}_i\}, i \in [1,J]$
  - Evaluate $f_\theta(\mathcal{X}_i)$
  - Evaluate cross-entropy loss:
    - $\mathcal{L}_{Di}(f_\theta) = \sum_{\mathcal{D}_i}(\mathcal{Y}_i * \log(f_\theta(\mathcal{X}_{si})) + (1-\mathcal{Y}_i)*\log(1-f_\theta(\mathcal{X}_{si})))$
  - Update $\theta$ with Stochastic Gradient Decent (SGD),
    - $\theta = \theta - \alpha * \nabla_\theta \sum_{\mathcal{D}_i} \mathcal{L}_{Di}(f_\theta)$
- End for
- Softmax probability distribution: $p(z_i) = \widehat{\mathcal{Y}_i} = \mathcal{Y}_i = \frac{e^{-v_i}}{\sum_i^N e^{-v_i}}$

FIG 10

| Input Data SNR in dB | Input Data Number of Wifi Devices | NN type | Train Cost | Train Accuracy | Train TRUE Positive Ratio | Train False Positive Ratio | Validation Cost | Validation Accuracy | Validation TRUE Positive Ratio | Validation False Positive Ratio |
|---|---|---|---|---|---|---|---|---|---|---|
| 6 | 10 | SM-L | 0.05258 | 1 | 1.0 | 0.0 | 0.069248 | 1 | 1 | 0 |
| -6 | 10 | SM-L | 0.03293 | 1 | 1.0 | 0.0 | 0.032767 | 1 | 1 | 0 |
| 20 | 20 | SM-L | 0.00695 | 1 | 1.0 | 0.0 | 0.001915 | 1 | 1 | 0 |
|  |  | SM-ML | 0.00225 | 1 | 1.0 | 0.0 | 0.008096 | 1 | 1 | 0 |
| 6 | 40 | SM-ML | 0.00333 | 1 | 1.0 | 0.0 | 0.016580 | 1 | 1 | 0 |
| 6 | 80 | SM-ML | 0.01409 | 1 | 1.0 | 0.0 | 0.017214 | 1 | 1 | 0 |
|  |  | SM-L | 0.03758 | 1 | 1.0 | 0.0 | 0.045269 | 1 | 1 | 0 |
|  |  | SM-G | 0.01120 | 1 | 1.0 | 0.0 | 0.025312 | 1 | 1 | 0 |
| 6 | 160 | SM-L | 0.006901 | 1 | 1.0 | 0.0 | 0.014755 | 1 | 1 | 0 |

FIG 14

- Number of devices D
- Each epoch has B meta-batch of size J×(N×K)
- For l = 1 to B
  - Sample batch of tasks $\mathcal{T}_i \sim p(\mathcal{T})$, $i \in [1, J]$
    - Choose $\binom{D}{N}$ devices and it's $\{\mathcal{D}_i, \mathcal{D}_i'\}$, where $\mathcal{D}_i = \{\mathcal{X}_i, \mathcal{Y}_i\}$ & $\mathcal{D}_i' = \{\mathcal{X}_i', \mathcal{Y}_i'\}$ (J×N×K)
    - $\mathcal{D}_i$ support set and $\mathcal{D}_i'$ is query set for meta-update
  - for i = 1 to J
    - For support set $\mathcal{D}_i$ generate $f_\theta(\mathcal{X}_i)$
    - Evaluate cross-entropy loss for : $\mathcal{L}_{\mathcal{D}_i}(f_\theta) = \sum_{\mathcal{D}_i} (\mathcal{Y}_i * \log(f_\theta(\mathcal{X}_i)) + (1 - \mathcal{Y}_i) * \log(1 - f_\theta(\mathcal{X}_i)))$
    - Update $\theta'$ with Gradient Decent, $\theta' = \theta - \alpha * \nabla_\theta \sum_{\mathcal{D}_i} \mathcal{L}_{\mathcal{D}_i}(f_\theta)$
    - For query set $\mathcal{D}_i'$ generate $f_{\theta_i'}$
    - For meta-update accumulate $\nabla_\theta (\sum_{\mathcal{D}_{i'}} \mathcal{L}_{\mathcal{D}_{i'}} (f_{\theta_i'}))$
  - end for
  - Update meta-parameter $\theta$ using gradient decent with the accumulated gradient on $\mathcal{D}_i'$
    - $\theta = \theta - \beta * \nabla_\theta \sum_{\mathcal{D}_{i'}} \mathcal{L}_{\mathcal{D}_{i'}} (f_{\theta_i'})$
- End for
- Softmax probability distribution: $p(z_i) = \dfrac{e^{-v_i}}{\sum_i^N e^{-v_i}}$

FIG 16

| Input Data SNR in dB | Input Data Number of Wifi Devices | NN type | Train Cost | Train Accuracy | Train TRUE Positive Ratio | Train False Positive Ratio | Validation Cost | Validation Accuracy | Validation TRUE Positive Ratio | Validation False Positive Ratio |
|---|---|---|---|---|---|---|---|---|---|---|
| 6 | 40 | SM-ML | 0.00333 | 1 | 1.0 | 0.0 | 0.016580 | 1 | 1 | 0 |
|  |  | MAML-ML | 0.007928433 | 0.99792 | 0.99792 | 0.00052 | 0.002970836 | 1 | 1 | 0 |
| 6 | 80 | SM-ML | 0.01409 | 1 | 1.0 | 0.0 | 0.017214 | 1 | 1 | 0 |
|  |  | MAML-ML | 0.043883849 | 0.98958 | 0.98958 | 0.0026 | 0.046747677 | 0.98958 | 0.98958 | 0.0026 |
| 6 | 160 | SM-ML | 0.016901 | 1 | 1.0 | 0.0 | 0.014755 | 1 | 1 | 0 |
|  |  | MAML-ML | 0.102913763 | 0.97917 | 0.97917 | 0.00521 | 0.141796757 | 0.95625 | 0.95625 | 0.01094 |

RF AWARE DEEP LEARNING AUTHENTICATION SOLUTION

CROSS REFERENCE SECTION

This application is a National Stage of International Application No. PCT/US2020/034454 filed May 25, 2020, claiming priority based on U.S. Provisional Application No. 62/852,673, filed May 24, 2019, the disclosure of which is incorporated herein in its entirety by reference.

This disclosure teaches techniques related to a Deep Learning based technology to address the vulnerabilities of wireless networks.

BACKGROUND

Wireless devices are becoming ubiquitous in consumer, enterprise, and industrial internet-of-things (IOT) applications and they have already been deployed in billions of units. As their deployments are scaled to tens of billions of units in the near future, the security vulnerabilities of wireless networks are also expected to grow exponentially.
Security Issues with Wireless Networks The existing security measures for wireless networks authenticate the wireless devices mainly based on their digital attributes. The ever growing and cheaper compute power can easily be deployed to compromise these digital attributes requiring deployment of complex procedures such as Multi-Factor Authentication (MFA) IOT devices such as cameras, thermostats, etc. are usually very lean on advanced security features and have been exploited by hackers to breach the network in many of the reported cases.

Following is the summary of some of the issues in the related art.
  Manual provisioning and management of security features
    Many consumer devices have no/default passwords
    Setting-up different passwords or MFA for plethora of devices is not realistic
  IOT devices security features are very scant
    Authenticated based on digital certificates, IP/MAC addresses
  IP/MAC addresses, digital certificates can be spoofed and passwords can be compromised
    Necessitates use of tedious methods like Multi-Factor Authentication (MFA)
  Even advanced mechanisms such as MFA and encryption can be compromised
    SIM swap is compromising security mechanism's like MFA
    Ever growing, cheap compute power can compromise encryption methods
Some of the Key Issue are as Follows:
  Network layer security is not sufficient and can be compromised by sophisticated bad actors deploying substantial compute resources. Therefore, network layer security has to be augmented by application layer security.
Current Solutions to Address Wireless Network Security As established before, the wireless network's security needs to be addressed in a layered approach that requires augmenting network layer security with application layer security. The application layer security companies that address some of these security concerns through Multi-Factor Authentication solutions are Duo-Mobile, Trusona, UnifyID etc. RFADL authentication system does not compete directly with solutions from these companies DuoMobile: Application being accessed generates a unique encrypted passcode in the cloud that is sent to the user's mobile phone via either phone call or text message, which the user can enter manually enter to login in the app or simply accept on the phone allowing automatic access to the app.
  Trusona: Eliminates manual entry of password by generating a unique image on the screen that user scans with the app on the mobile phone to authenticate the user thereby giving access to the desired application without password.
  UnifyID: Authenticates users based on users' implicit behavioral attributes such as walking pattern etc derived from the mobile phones, apple watch. A Deep Learning algorithm running in the cloud authenticates the user based on data derived from sensors such as accelerometer, gyroscope, etc in the iphone, apple watch.

There is another class of companies that are working on wireless physical layer security only. Bastille Networks is a radio threat detection company that scans local RF spectrums for rogue radio. Following are the key attributes of such a solution:
  Primarily focused on detecting rogue wireless systems trying to infiltrate the network
  Does not provide automated unique authentication of the device
  Primarily a localized HW solution of limited capabilities running a simpler ML algorithm
Issues around existing Multifactor Authentication Systems solutions can be summarized as follows:
  None of them provide automated authentication.
    None of them uniquely authenticate the device in terms of its RF environment.
The disclosed teachings are aimed at overcoming some of the disadvantages noted above in the related art

SUMMARY OF THE INVENTION

To overcome some of the disadvantages in the related art there is provided a system for authenticating a wireless device. The device comprises an RF feature extractor operable to extract RF features related to a plurality of wireless devices. A deep learning engine is provided which is operable to learn the RF features evaluates RF features related to the plurality of devices. The RF extractor is operable to further receive RF features of a new instance of a specific wireless device from the plurality of devices. An analyzer is operable to detect a signature for the specific wireless device using the RF characteristics about the new instance using the deep learning engine.

In an specific enhancement, the RF features include device specific RF features and environment specific RF features.

In another specific enhancement, the RF features are represented as real valued RF feature tensors.

In a more specific enhancement, the device specific RF features include at least one selected from power amplifier non-linearity, timing offset, wavelet analysis vector and automatic gain control.

In another specific enhancement, the environment specific RF features include at least one selected from RF channel, space time block code, FEC decoder, IP address, MAC address.

In a more specific enhancement, the system further comprising a homomorphic encryption unit operable to sample and encrypt RF feature tensors prior to processing by the deep learning engine.

In a specific enhancement, the deep learning engine runs in cloud.

In another specific enhancement, the deep learning engine runs locally.

In yet another specific enhancement, the deep learning engine is a fully connected Neural Network.

In another specific enhancement, the deep learning system is a model agnostic meta-learning system.

In another specific enhancement, the system further comprising an authentication server through which an application server communicates with the deep learning engine wherein the authentication function using the deep learning engine is integrated with other authentication functions in the authentication server.

In another specific enhancement, the deep learning engine directly communicates with the application server.

In another specific enhancement, the deep learning engine is located locally.

In another specific enhancement, the authentication function is integrated into commercially available identity management systems.

In a more specific enhancement, the system further comprising a configurable wireless architecture that enable authentication of wireless devices.

More specifically, the configurable wireless architecture comprises a configurable RF frontend and a configurable baseband DSP.

More specifically, the configurable baseband DSP further comprises a transmit baseband DSP and a receiver baseband DSP.

More specifically, the transmit baseband DSP further comprises, a configurable FEC code, a configurable IFFT, a configurable space time blocker coder and a configurable transmit digital RF.

More specifically, the receiver baseband DSP further comprises a configurable receiver digital RF, a configurable space time block decoder, a configurable EFT, a configurable equalizer and a configurable FEC decoder.

More specifically, the configurable RF frontend further comprises a transmit RF frontend and receiver RF frontend.

More specifically the transmit RF frontend comprises, a digitally synthesized RF oscillator, an RF mixer and a power amplifier. More specifically, the receiver RF frontend comprises a low noise amplifier, a digitally synthesized RF oscillator, an RF mixer and a source acoustic filter.

More specifically the deep learning engine is a fully connected neural network with soft-max based system.

More specifically, the deep learning engine is a model agnostic meta-learning based system.

More specifically, the RF feature extractor is operable to separate received data into stochastically sampled inference support set and a query set.

More specifically, the deep learning engine is operable to process the inference support set and update the deep learning neural net based a loss derived from the deep learning neural net using a stochastic gradient descent and further operable to process the query set using updated deep learning neural net.

Yet another aspect of the disclosed teachings is a method of authenticating a wireless device comprising receiving a tensor with RF features related to the device. The tensor is processed through a trained deep learning neural net engine to receive an authentication prediction. A confidence level of the prediction is measured. The authentication device is designated as authenticated if the confidence level reaches a threshold.

In a specific enhancement, the RF features include device specific RF features and environment specific RF features.

In another specific enhancement, the RF features are represented as real valued RF feature tensors.

In another specific enhancement, the device specific RF features include at least one selected from power amplifier non-linearity, carrier offset, timing offset, wavelet analysis vector and automatic gain control.

In a specific enhancement the deep learning neural net is trained using a method comprising receiving a data set of RF tensors from the wireless device. The data set is stochastically sampled into training set and validation set. The training set is processed through the deep learning neural net. The validation set is processed through the deep learning neural net. The validation set loss, accuracy, true positive ratio and false positive ratio are measure. Steps are repeated till a desired performance criteria is met.

In a specific enhancement, the received data set is separated into stochastically sampled inference support set and a query set.

In a specific enhancement, the inference support set is processed through the deep learning engine, a loss is computed, the deep learning neural net is updated based on the loss using a stochastic gradient descent and the query set is processed through the updated deep learning neural net.

In a specific enhancement, the data is separated into inference support set and query set.

In a specific enhancement the support data set is processed. A modified meta-parameter is generated using a stochastic gradient descent. The query data set is processed using the modified meta-parameter and the results are used to update the meta-parameter.

In another specific enhancement inference support set and query sets are used.

BRIEF DESCRIPTION OF THE DRAWINGS

The above objectives and advantages of the disclosed teachings will become more apparent by describing in detail preferred embodiment thereof with reference to the attached drawings in which:

FIG. 3A shows an exemplary implementation of a RF Aware Deep Learning (RFADL) with commercial wireless chips according to the disclosed teachings, where locally running deep learning directly communicates authentication signal to the application.

FIG. 7 shows example mathematical algorithms that implements a RFADL based on fully connected Neural Network with Soft-Max based classification shown in FIG. 6.

FIG. 10 shows performance of RFADL in simulation under different kinds of RF environments.

FIG. 14 shows the mathematical algorithms that implements a RFADL based MAML classification shown in FIG. 13

FIG. 16 shows performance of MAML based RFADL in simulation under different kinds of RF environments.

DETAILED DESCRIPTION OF THE INVENTION

Figure 1A:
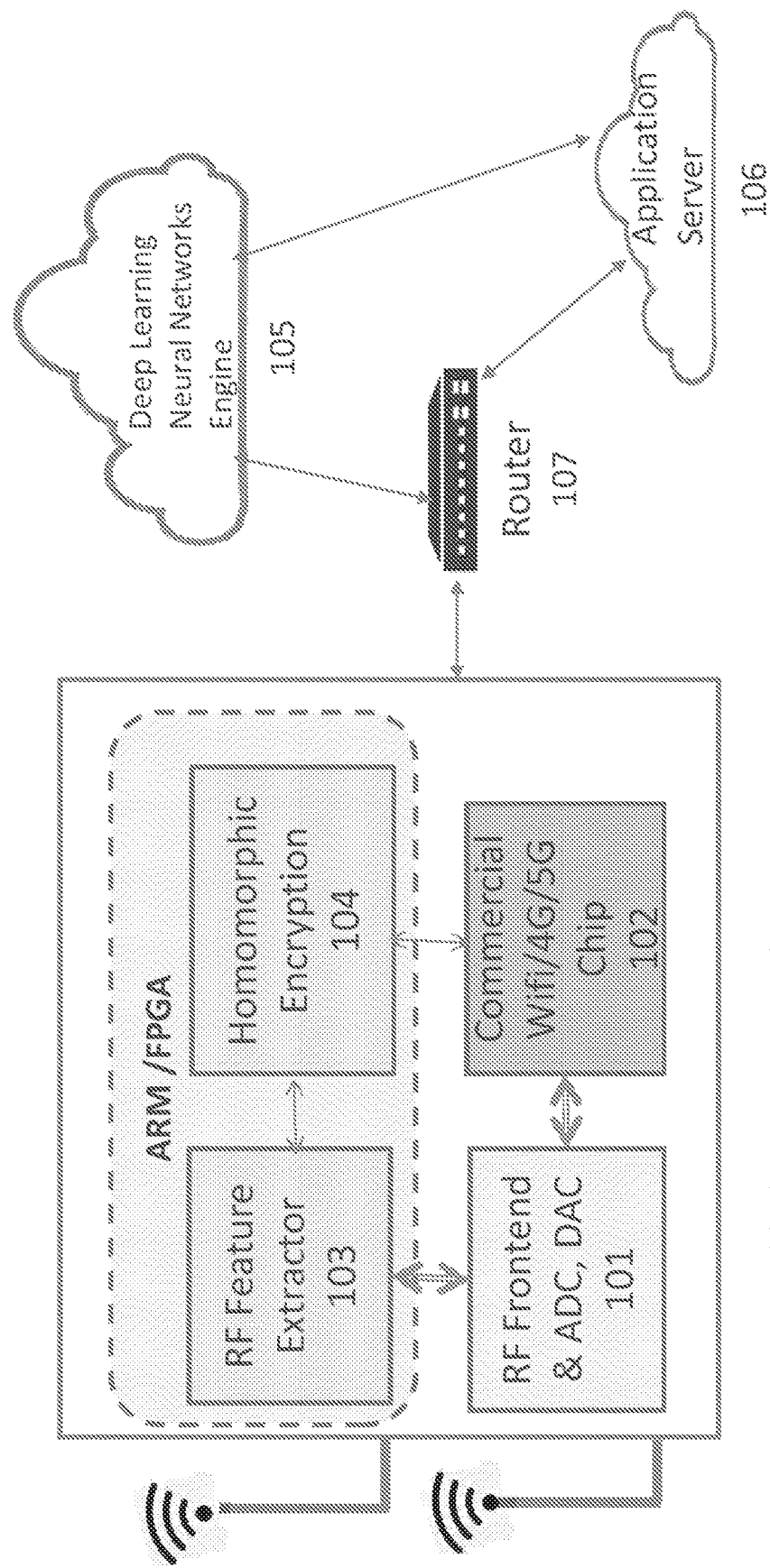
FIG. 1A shows an exemplary implementation of a RF Aware Deep Learning (RFADL) system according to the disclosed teachings with commercial wireless chips, where cloud based deep learning directly communicates authentication signal to the application.

The disclosed teachings provide an RFADL system that could be used either to Augments/Replaces existing security policies Integrates with ecosystems of Identity Management Solutions (Google CIAM, Okta, Azure Ad, etc)
The Features of the Disclosed Teachings that Distinguish it from Related Art
RF Aware Deep Learning (RFADL) technology according to the disclosed teachings provides a deep learning based authentication solution to application layer. RFADL solution is partitioned between low cost off-the-shelf chips based RFADL enabled hardware (HW), and complex Machine Learning (ML) algorithms running in the cloud. RFADL authenticates a wireless device based on time-varying RF characteristics of the device coupled with time-varying characteristics of the RF environment around it (FIG. 1A). The RF characteristics of a device vary over time based on temperature, pressure and manufacture anomalies. The RF environment around the device affects transmission between the device and the wireless receiver inside RFADL hardware, and varies in time as well as a function of the device's (possibly) changing physical location. RFADL technology can uniquely identify the device by learning the time varying RF characteristics of the device and the environment the device operates in. Thus the solution identifies the device across different geographical location with in a building (different rooms within a house, different cubicles, conference rooms in an office) and different geographical locations (house, office, different office building, commonly frequented places such as Startbucks, MCD)

Following are the high level attributes that distinguish the disclosed technology from related art:
Automatically address the security vulnerabilities for authentication and access
Cloud based Deep Learning authentication solution
Certification of Identity based on RF environment device operates in
Based on immutable RF properties of wireless network devices
No computational burden on client devices
Co-exists with current wireless infrastructure
Uses time varying RF feature vector
Factors considered orders of magnitude more than state-of-art mechanisms used today
Cannot be compromised with brute force compute power
Delivers low Latency
Augments/Replaces existing security policies
Integrates with ecosystems of Identity Management (WI) Solutions (Google CIAM, Okta, Azure Ad, etc)
Meta Learning framework to deal with dynamic environment
Certificate of Identity can replace/augment factors in MFA
Can add additional level of security based on client location type
Eliminates "Sim-Faking", other man-in-the-middle attack
Decentralized Privacy preserving solution
An Advanced version of the RFADL technology incorporates Meta-Learning framework to deal with dynamic RF environments The Radio Frequency (RF) Aware Deep Learning (RFADL) technology according to the disclosed teaching address vulnerabilities described above. The techniques according to the disclosed teachings comprises of a RFADL enabled hardware based on off-the-shelf chips, and a machine learning algorithm running in the cloud. The RFADL technology mitigates security vulnerabilities of potentially billions of wireless nodes by authenticating them using a unique machine learning based awareness of the RF environment they operate in. The authentication solution based on RFADL can be integrated with the existing ecosystems of Identity Management systems and will enhance their overall security. The RFADL technology's core algorithms have been developed in Tensorflow and PyTorch, and have been tested for robustness and accuracy under diverse and challenging RF conditions.

The RFADL technology is applicable across consumer, enterprise and industrial IOT market segments.

Overall Block Diagram of an Exemplary Implementation

FIG. 1A describes cloud based implementation of RFADL that incorporates commercial wireless chip 102 for wife WLAN, 4G/5G chips for cellular connectivity, and Bluetooth chips for short reach connectivity. This implementation involves additional RF frontend circuitry 101 to split the RF signal to RF feature extractor 103. The RF feature extractor 103 computes RF features that are not readily available from the commercial wireless chips. The RF features acquired from the two sources are real valued Tensors that are encrypted by Homomorphic Encryption scheme implemented in 104 and then transported via a router 104 to the cloud in a secure fashion. The portion of RFADL running in the cloud is 105 that decrypts the RF feature Tensor using the secure key and then is processed through Deep Learning engine running in the cloud. There are at least two possible mechanisms for authentication, one that involves directly communicating the outcome with application and the other that is integrated with other commercially available identity management systems such as Okta, Google CIAM, Microsoft Azure, etc. In this implementation the authentication outcome from the Deep Learning engine is directly communicated to the application server 106.

Figure 1B:
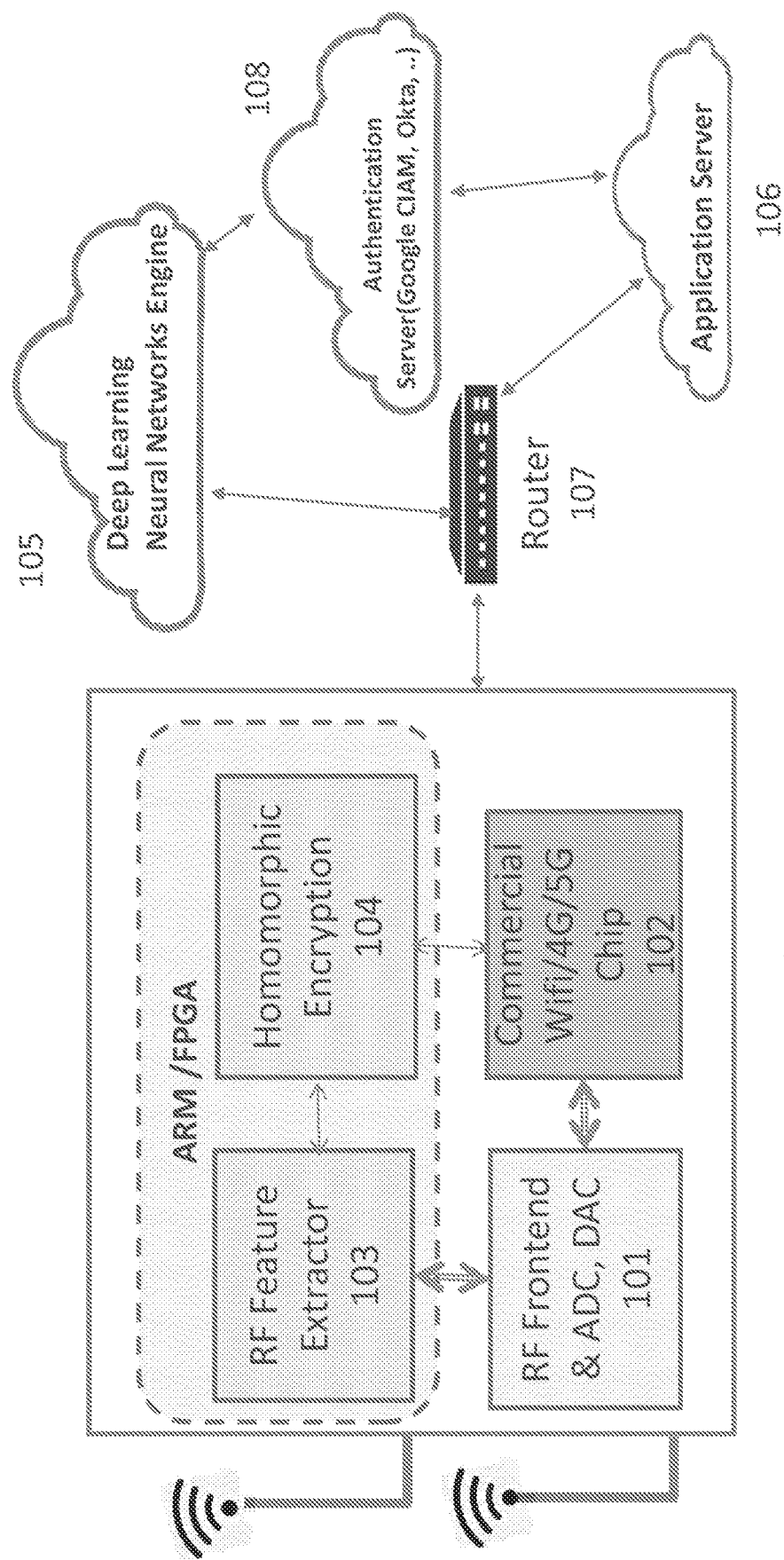
FIG. 1B shows an exemplary alternate implementations of a RF Aware Deep Learning (RFADL) system with commercial wireless chips according to the disclosed teachings, where cloud based deep learning communicates authentication signal to an Identity Management system.

FIG. 1B describes an alternate implementation of RFADL as in FIG. 1A and as described above, with the primary difference that the authentication is integrated with other commercially available identity management systems. These identity management systems provide Multi-Factor Authentication (MFA) and the authentication from the Deep Learning engine running in the cloud can be used to augment or replace other authentication mechanisms. The mechanism of RFADL interacting with commercial Identity management solution to provide integrated solution is described in FIG. 12.

Figure 2A:
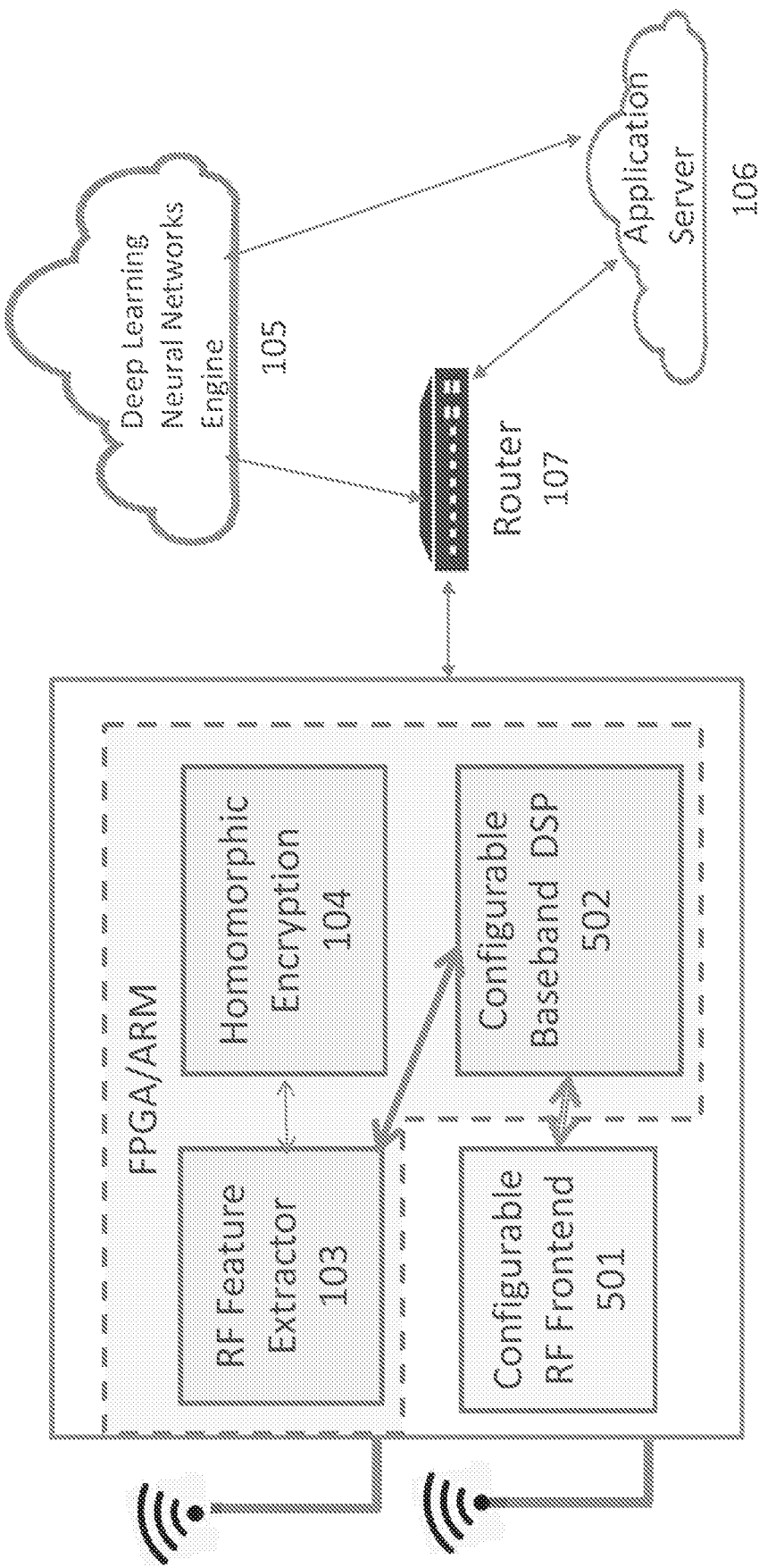
FIG. 2A shows an exemplary implementation of a RF Aware Deep Learning (RFADL) system with configurable wireless solution according to the disclosed teachings, where cloud based deep learning directly communicates authentication signal to the application.

FIG. 2A describes cloud based implementation of RFADL that incorporates a configurable wireless architecture in 510 & 502 that can enable authentication of different wireless devices such as Wifi, 4G/5G etc with the same hardware. The configurable wireless has the configurability built in to both its RF circuitry 501, as well as its baseband DSP in 502 to provide the relevant information for the RF feature extraction in 103. The homomorphic encryption 104 and the rest of the blocks in the cloud such as Deep Learning engine, etc (105, 106,107) remain the same as in FIG. 1A. The mechanism for direct authentication with application remains the same as in 'i.

Figure 2B:
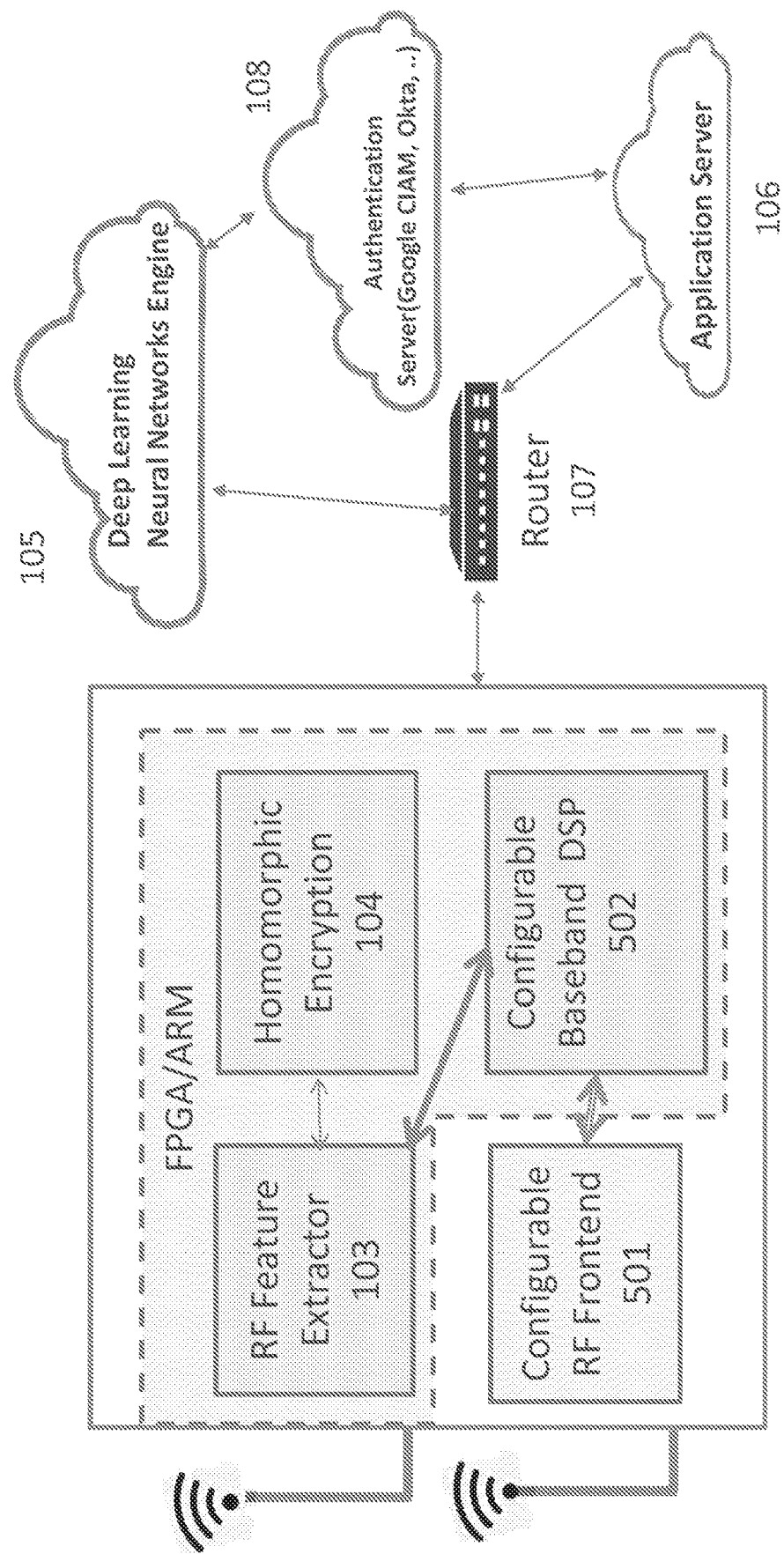
FIG. 2B shows an exemplary alternate implementation of a RF Aware Deep Learning (RFADL) configurable wireless solution according to the disclosed teachings, where cloud based deep learning communicates authentication signal to an Identity Management system.

FIG. 2B describes an alternate implementation of RFADL as in FIG. 2A and as described above, with the primary difference that the authentication is integrated with other commercially available identity management systems. The mechanism of RFADL interacting with commercial Identity management solutions to provide an integrated solution is described in FIG. 12•

There are instances of the RFADL application that might require implementing Deep Learning engine locally. FIG. 3A, 4 illustrate alternate implementations of applications where the deep learning engine is run locally on GPU/FPGA. FIG. 3A shows localized system implementation of RFADL authentication system based on commercial chips 102 for Wifi/4G/5G, RF front-end 101, RF Feature extractor 103 and Deep Learning engine 104. Similarly FIG. 4A shows a localized RFADL with a configurable wireless architecture depicted by 501, 502 and RF Feature extractor 103 and Deep Learning engine 105. The authentication decision is communicated directly to the application server 106 as in 'i'•

Figure 3B:
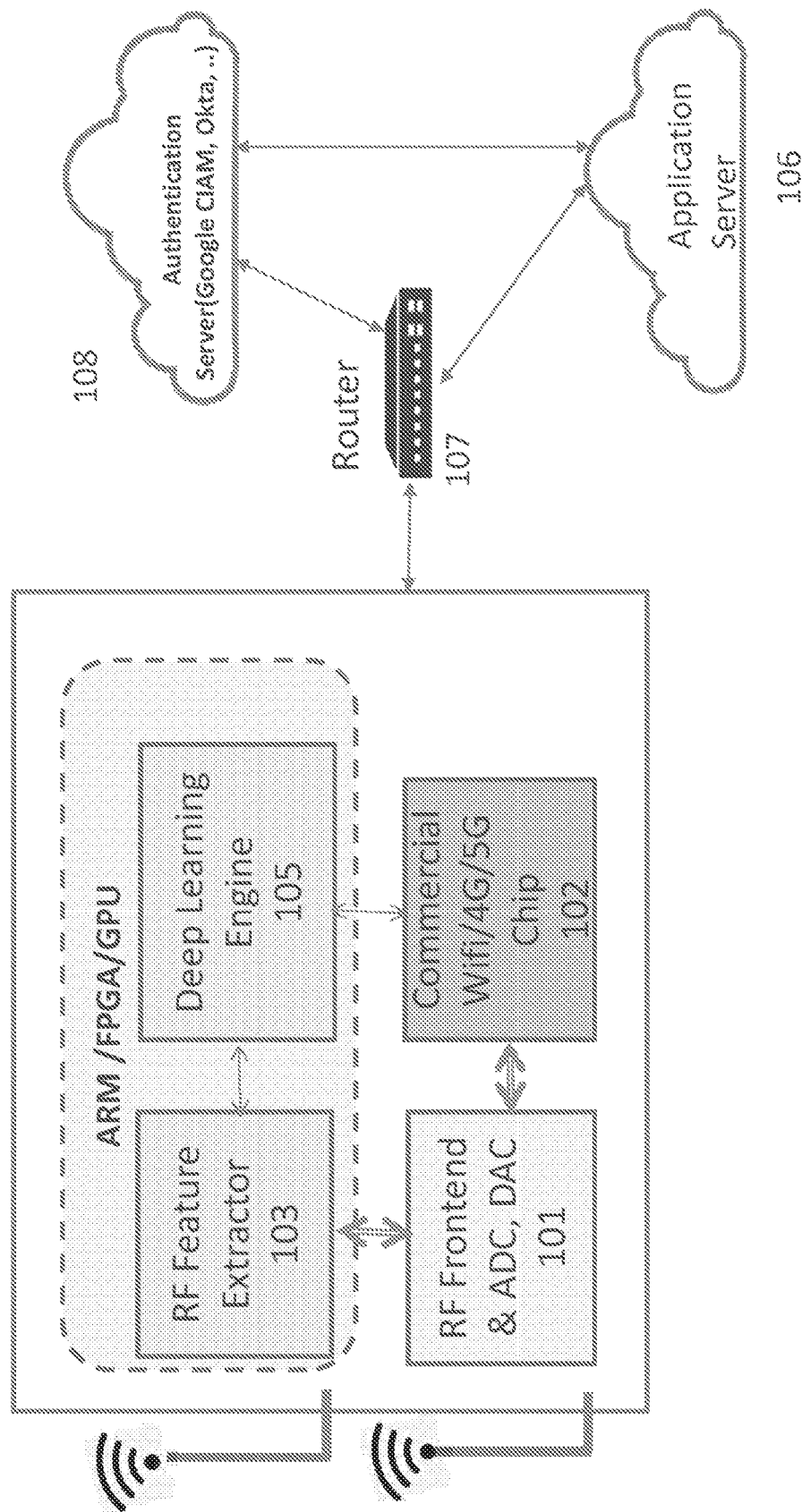
FIG. 3B shows an exemplary implementation of a RF Aware Deep Learning (RFADL) with commercial wireless chips according to the disclosed teachings, where locally running deep learning communicates authentication signal to an Identity Management system.
Figure 4A:
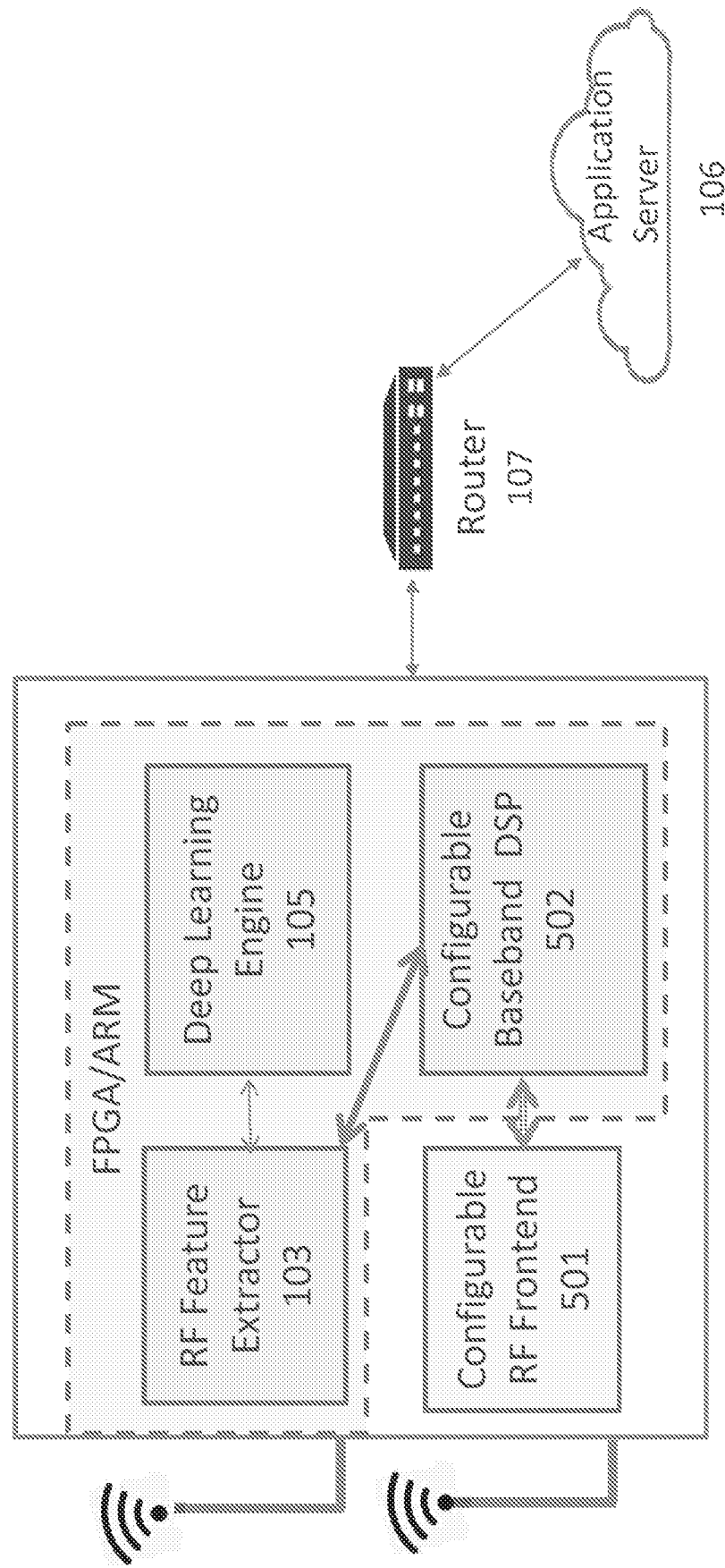
FIG. 4A shows an exemplary implementation of RF Aware Deep Learning (RFADL) system with configurable wireless solution according to the disclosed teachings, where locally running deep learning directly communicates authentication signal to the application.
Figure 4B:
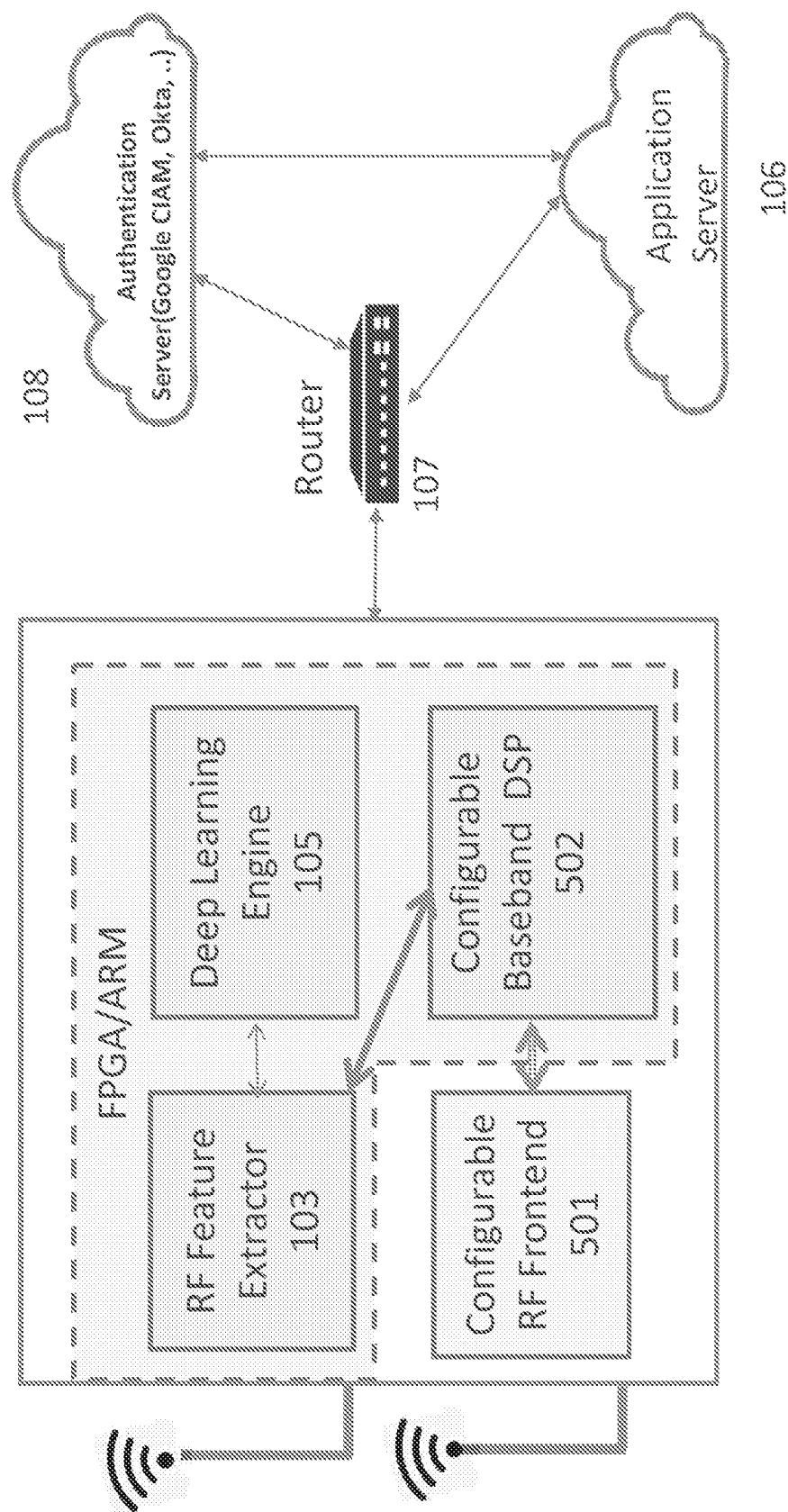
FIG. 4B shows RF Aware Deep Learning (RFADL) system with configurable wireless solution according to the disclosed teachings, where locally running deep learning communicates authentication signal to an Identity Management system.

FIGS. 3B & 4B describe similar implementation of RFADL as in FIG. 3A, 4A and as described above, with the primary difference that the authentication is integrated with other commercially available identity management systems. The mechanism of RFADL interacting with commercial Identity management solution to provide an integrated solution is described in FIG. 12.

Figure 5:
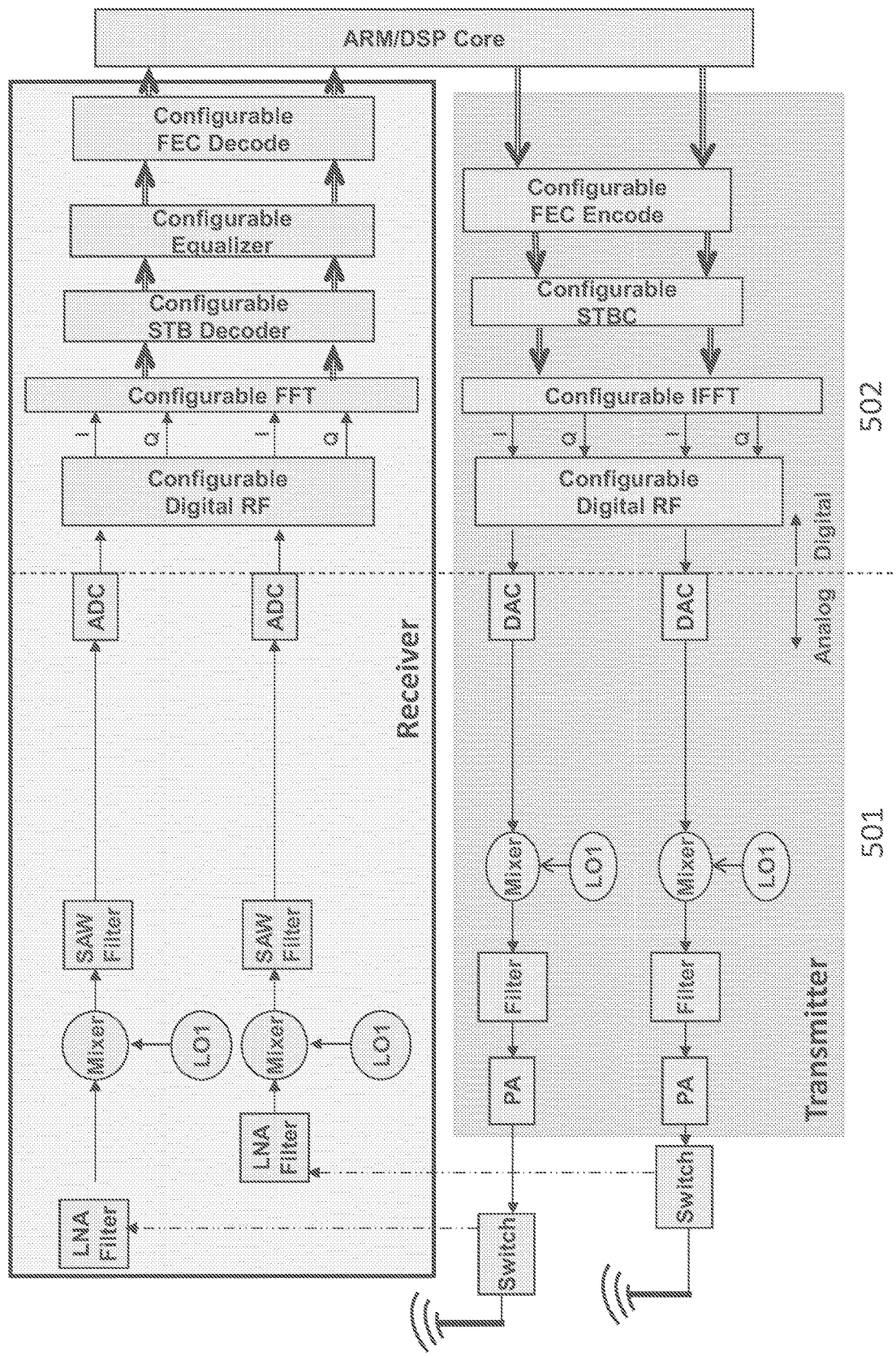
FIG. 5 shows an exemplary implementation of Configurable Multiple Input Multiple Output (MIMO) Wireless Architecture according to the disclosed teachings.

An exemplary implementation of the Configurable MIMO wireless architecture is shown in FIG. 5. It is comprised of a configurable RF architecture (501), as well as configurable baseband architecture (502). Wireless standards for 4G/5G/Wifi all comprise of modulated and coded OFDM of different types. These standards all occupy different location in the spectrum in Ghz range and also have different channel bandwidth 20 Mhz to 100+ Mhz. Some of the recent standards have two main mechanisms for higher throughput, one of them being Multi Input Multi Output (MIMO) antennae systems and the other one being concatenation of contiguous as well as non-contiguous channels. MIMO system in combination with Space Time Codes allow higher throughput (k×160 Mbps) by creating orthogonal channels in space through multiple antennas. They alternatively allow dealing with poor channel (spectral nulls) conditions by enabling beamforming thus providing improved throughput under such conditions. Making use of multiple contiguous and non-contiguous (n×20 MHz) spectral channels by a single device allows higher throughput (n×160 Mbps). Following is the description of each of the blocks in FIG. 5:

i. Configurable Baseband Architecture 502:

Transmit baseband Digital Signal Processor (DSP)—Comprises of programmable ARM/DSP core that implements control function standard as well as moderate compute DSP functions required for various wireless standards of Wifi. 4G, 5G. For RF ADL, it implements the portions of the standard that is required for RF feature extraction.

Configurable Forward Error Correction (FEC) encode enables implementation of different encoders such as LDPC, Turbo Codes etc with the same hardware.

Configurable Inverse Fourier Transform (IFFT) implements different sized Inverse Fast Fourier Transforms (e.g. 256, 512, 1024 etc) as required by, wireless standard with the same HW.

Configurable Space Time Block Coder (STBC) implements different types of codes with same HW.

Configurable Transmit Digital RF implements programmable blocks such as digital IQ (Sin/Cos) oscillator, digital intermediate frequency (IF) modulator (in 10's-100's Mhz) and multirate filters (MF), It takes the complex (I/Q) baseband signal and modulates it up to an intermediate frequency (IF) such that it can be converted to a real signal without aliasing. It takes these sets of real signal and converts them to an analog IF signal for each of the antennas by a bank of digital to analog converters (DAC) such that these sets of IF signals can further be mixed up to required carrier frequency by a RF mixer.

Receiver Baseband DSP:

Configurable Receiver Digital RF has similar blocks as the in the transmit case, namely digital IQ (Sin/Cos) oscillator, digital intermediate frequency (IF) modulator (in 10's-100's Mhz) and multirate filters (MF). It takes each of received real antenna signal from DAC and mixes it with IQ oscillator and then processes it through MF to produce baseband demodulated IQ signal.

Configurable Space Time Block Decoder (STBD) processes set of IQ signals from antennas to produce orthogonalized signals for different wireless standards.

Configurable Fast Fourier Transform (FFT) processes the decoded signals for various wireless standards thereby reversing IFFT in transmitters.

Configurable Equalizer recovers the original transmitted complex symbol by equalizing individual frequency bin.

Configurable FEC decoder processes the decoded symbol and its associated bits to detect & correct errors in it for various wireless standard ii. Configurable RF Architecture (501):

Transmit RF: Comprises of digitally synthesized RF oscillator (sine), RF mixer, RF filter and power amplifier (PA). These RF blocks take real IF signal at the output of DAC for each of the antennas to the final carrier frequency (in Ghz).

Receiver RF: The low voltage (in microVolts) signals from each of the antennas as processed through a low noise amplifier (LNA), digitally synthesized RF oscillator (sine), RF mixer and a surface acoustic filter (SAW) to bring the signal from its carrier frequency (in Ghz's) to an IF (in 10's-100's Mhz). These set of IF signal is then converted through a bank of analog to digital converters (ADC)

In the implementation described in FIG. 1A, 1B or FIG. 3A, 3B that is based on commercial wireless chips, the blocks 101 and 103 implement a subset of the configurable wireless MIMO architecture given in FIG. 5. The subset is chosen so as to process the signals to extract RE features that are not available from commercial chips.

FIGS. 2A, 2B and 4A, 4B describe implementation based on configurable MIMO architecture in FIG. 5 such that the signals processed through it will enable RF feature extraction fully.

RF Feature Extractor (103): There are several RF features that are extracted to create a RF Feature Tensor for further processing by the Deep Neural Network engine according to this implementation. There are two classes of RF features, first one are related to the device being authenticated and the latter pertaining to the environment the device operates in i. Device related RF features:

Power Amplifier (PA) Non-Linearity: One of the last blocks in the transmitter of the device is the PA. This analog module inadvertently adds a small amount of non-linearity. The model for this non-linearity is extracted at the receiver using either a time domain based Volterra series or a frequency domain based Volterra series. A truncated time domain Volterra series can be represented as $\tilde{x}(n) = x(n) + a_1 * x^2(n) + a_2 * x(n) * x(n-1) + a_3 * x^2(n-1) + a_4 * x(n-1) * x(n-2)$ $A_V = [1 a_1 a_2 a_3 a_4]$ Timing offset between the device transmitter and the RFADL receiver clocks $T = [t_\Delta]$ Carrier frequency offset and carrier phase offset $e^{j(\Delta\omega n + \phi)}$ between the device transmitter and the RFADL receiver, $C = [\Delta\omega \phi]$ Wavelet analysis vector's that provides time-frequency characteristics of wireless signal at start-up.

Automatic Gain Control (AGC): RF signal chain in the receiver has AGC before signal is processed through ADC. AGC could be real or complex depending on the RF architecture.

Gain $G = [g]$ or $[g_i + I g_q]$ ii. RF Environment related features:

RF Channel: A MIMO system with k-transmit antennas and m-receive antennas, the RE channel is defined by the matrix H that is derived during training $$H = \begin{bmatrix} h_{11} & h_{12} & \cdots & h_{1k} \\ h_{21} & h_{22} & \cdots & h_{2k} \\ \vdots & \vdots & \ddots & \vdots \\ h_{m1} & h_{m2} & & h_{mk} \end{bmatrix}$$

Space Time Block Code (STBC): Defined by matrix S

FEC Decoder: The FEC codes typically employed in wireless communications include Low Density Parity Check Codes (LDDC), Turbo Codes, etc. The decoding schemes for such codes involve recursive message passaging algorithms for LDDC codes and Log Maximum A Posteriori (MAP) BCJR algorithm for decoding Turbo Codes resulting in a vector of Log Likelihood estimates. Let such Vector Log Likelihood be called $V_{LL}$ $V_{LL} = [l_1 l_2 \ldots l_n]$ IP address: IP address ($IP_D$) of the router the device is connected to.

MAC address: MAC address of the device ($MAC_D$)

iii. The RF feature Tensor is assembled from functions of scalars and vectors described above.

$\Gamma_{RF} = [\chi(A_V, T, C, G, W(f(H,S)g(V_{LL})q(IP_D, MAC_D)]$ v. Homomorphic Encryption (104): In FIG. 1A, 1B and FIG. 2A, 2B, the RF feature tensors are periodically sampled and then are encrypted through Homomorphic encryption scheme before being transported to the Deep Learning engine in the cloud. The architecture shown in FIGS. 3A, 3B and 4, 4a does not expire any type of encryption as Deep Learning engine resides locally.

vi. RFADL (105): The deep learning engine as depicted in FIGS. 1A, 1B and 2A, 2B runs in the cloud after decrypting the tensors through Homomorphic decryption, whereas it runs locally in the implementation shown in FIGS. 3A, 3B & 4A, 4B. There are two implementation of RFADL (105), the first one is a fully connected Neural Network with Soft-Max based classification depicted in FIG. 6, 7 and the other is Model Agnostic Meta-Learning (MAML) based classification described below in 'iv'. While Soft-Max classification adapts Neural Networks in training mode and is fixed during inference mode, the Model Agnostic Meta-Learning (MAML) is able to adapt in both modes to adjust to changing conditions Following is a Brief Description of the Deep Learning Engine:

i. RF Feature Tensors $X_T$ (601): This block collects the RF feature Tensor $\Gamma_{RF}$ received periodically from D authenticated devices and stores them in the database. The output $X_T$ from the database that is used for training is of dimension $D \times N_T$.

ii. Stochastic Data Sampler (602): It stochastically selects $N_T$ tensors out of N of them for training and the remaining $N_V$ are kept for validation.

$$X_T = \begin{pmatrix} \Gamma_{11} & \cdots & \Gamma_{1N_T} \\ \vdots & \ddots & \vdots \\ \Gamma_{D1} & \cdots & \Gamma_{DN_T} \end{pmatrix}$$

$X_T$ is further sampled stochastically to create another tensor $X_s$ of dimension B×J, i.e.

$$\underset{D \times N_T}{X_T} \Leftrightarrow \underset{B \times J}{X_s}$$

where B is associated with the batch size B of J data samples used to train neural networks.

Y is a reference tensor of labels of shape B×J for training.

A derived set of tensor $\mathcal{D}_T = [X_s, Y]$ is used for training the neural network. The corresponding validation set of tensors is called $\mathcal{D}_V$. The goal is to have $\mathcal{D}_T$, $\mathcal{D}_V$ such that it captures sufficient stochasticity to allow adaptation of the neural networks $\mathbb{F}(\theta)$ without overfitting.

iii. A fully connected Neural Network $\mathbb{F}(\theta)$ with Soft-Max based classification is described in FIG. 6, 7, details of which are given below:

- The adaptation Neural Network $\mathbb{F}(\theta)$ (600), which is a collection of adaptive blocks, namely convolution filters (603), recurrent neural networks (604), linear transformation layer (605) and soft-max classifier (606), is done in B iterations. The input tensor is of dimension B×J
- The neural network comprises of set of convolution filters (603) that outputs $f(A^T X_s)$. It outputs J×M tensors of reduced dimensionality. The convolutional filters effectively act as a weighted average over a time window in the original signal. This weighted average is learned via backpropagation and stochastic gradient descent-based optimization.
- is followed by a Recurrent Neural Network (604) (RNN, LSTM, GRU etc) that outputs signal U. The recurrent network processes the output of each time window's weighted average (from the convolutional operation's output) sequentially. This captures the time evolution signature of the RF signal in a single feature vector. The output tensor U is of reduced dimensionality in time and is J×L, where L<M.
- The feature vector representing the signature is fed in to Linear Layer (605): $V = W^T * U + b$ to create device logits by projecting the feature vector to a D-dimensional space where device classification can be performed. V is of dimension J×D
- The logits V are fed into a Soft-Max function (606) block to estimate the relative probability of the devices in this D-dimensional space and perform classification on those probabilities $$p(z_i) = \bar{y}_i = \frac{e^{-v_i}}{\sum_i^N e^{-v_i}}$$

Figure 13:
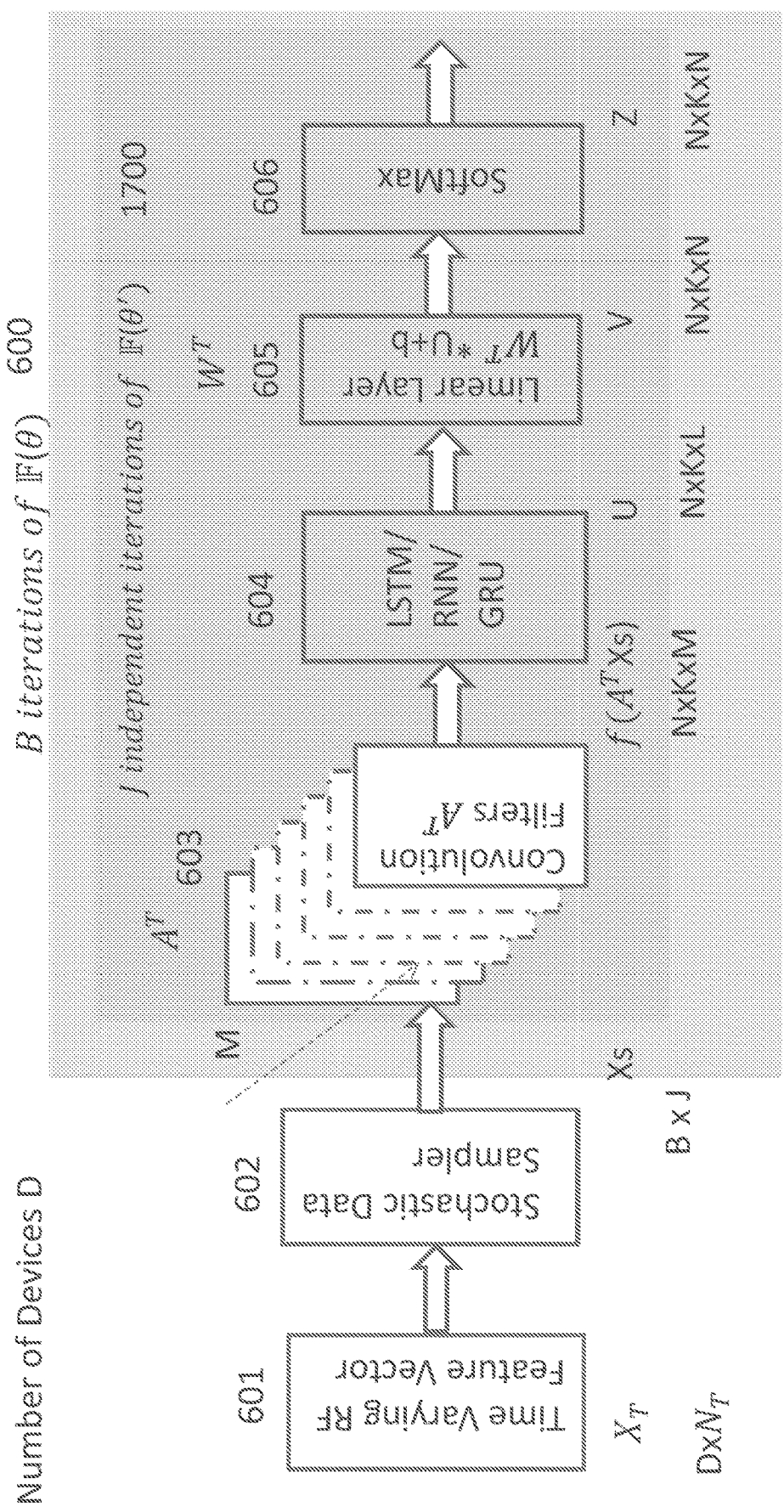
FIG. 13 shows an exemplary implementation of a RFADL based on MAML classification

All of the component blocks of $\mathbb{F}(\theta)$ are adaptive and updated using Stochastic Gradient Decent (SGD) algorithm during training phase as described in FIG. 7. The SGD algorithm minimizes soft-max cross-entropy loss and updates θ using gradients that are calculated by back-propagation. During validation/testing phase no adaptation occurs, the estimated values of θ are kept fixed and used to classify the input RF Feature Tensors $X_T$ (601)

iv. FIG. 13, 14 describes the Model Agnostic Meta-Learning (MAML) for N-way K-shot based classification. MAML requires estimating and updating two parameters θ and θ', representing two different Neural Networks.

- RF Feature Tensors $X_T$ (601): same as in 'iii'
- Stochastic Data Sampler (602): same as in 'iii' except that the Tensors are split into Training set $\mathcal{D}_T$, and Validation set $\mathcal{D}_V$, which are each further split into a Support and a Query set such that $\mathcal{D}_T = [\mathcal{D}_{Ti}, \mathcal{D}_{Ti}']$, $\mathcal{D}_V = [\mathcal{D}_{Vi}, \mathcal{D}_{Vi}']$, with meta-batch size J×(N×K).
- MAML requires the adaptation of a higher level Meta Neural Network $\mathbb{F}(\theta)$ (600), from a local instantaneously adapted copy $\mathcal{F}(\theta')$ (1700), both of which are a collection of adaptive blocks such as convolution filters (603), recurrent neural network (604), linear layer (605) and soft-max classifier (606).
- Neural Network $\mathbb{F}(\theta)$ (600): Meta-parameter θ is updated in B iterations using Query set tensors from (602)
- Neural Network $\mathcal{F}(\theta')$ (1700): θ' is calculated in J independent iterations using an SGD update of θ on Support set tensors from (602)
- Convolution filters (603) that outputs $f(A^T Xs)$ are same as in 'iii', except its output is N×K×M, for N-way K-shot MAML
- Recurrent Neural Network (604): same as in 'iii', except its output is N×K×L, for N-way K-shot MAML
- Linear Layer (605): same as in 'iii', except its output V is N×K×N, for N-way K-shot MAML
- Soft-Max function (606): same as in 'iii', except its output Z is N×K×N, for N-way K-shot MAML
- All of the component blocks of $\mathbb{F}(\theta)$, $\mathcal{F}(\theta')$ are adaptive and updated using a Stochastic Gradient Decent (SGD) algorithm during training phase as described in FIG. 13, 14. The SGD algorithm minimizes soft-max cross-entropy loss and updates θ to θ' in the inner loop, using gradients that are calculated by back-propagation from Support set. Meta-parameter θ is updated similarly but with higher order gradients resulting from the loss generated from the application of $\mathcal{F}(\theta')$ to the Query set. However, during validation/testing phase no adaptation occurs on meta-parameter θ, but θ' is still calculated from an SGD update on the Support set.

vi. RFADL authentication (108, 106): There are two mechanisms for Deep Learning engine (105) for communicating with application server (106) for authentication a wireless device.

A. First mechanism that is shown in FIG. 1A, 2A, 3A, 4A directly communicates with the application server.

Figure 12:
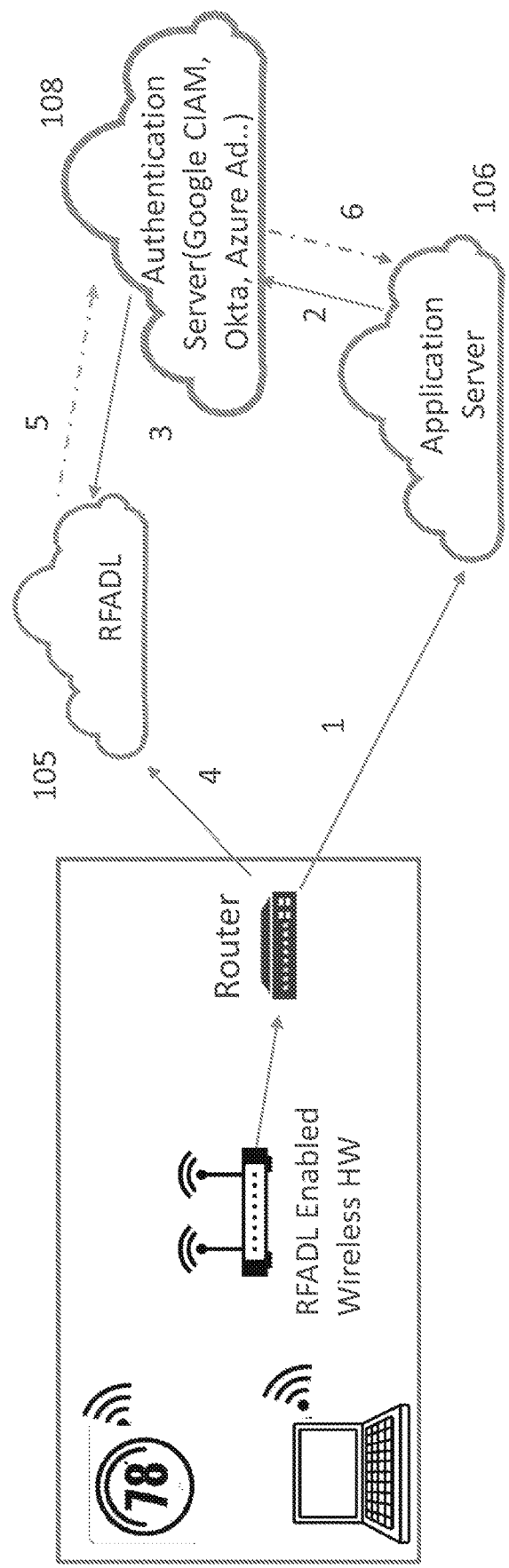
FIG. 12 shows an exemplary implementation of a RFADL Authentication Process with commercial Identity Management systems

- Step 1. Devices attempts connecting with Application Server
  - forward ID, passwords, digital certificates, IP/MAC addresses
- Step 2. Application Server directly request RFADL
  - Forwards digital certificates, IP/MAC address
- Step 3. RFADL acquires feature tensor from the device
  - Processes as per FIG. 6, 7, 8 or FIG. 13, 14, 15
  - Respond appropriately to the application Step 4. Application takes appropriate action based on FADL response B. The second mechanism that is shown in FIG. 1B, 2B, 3B, 4B integrates RFADL in the existing ecosystem of Identity management systems which are already in use widely for certain authentication scenarios. The RFADL use for authentication in conjunction with existing identity Management system could be used to either augment or replace its existing mechanisms. FIG. 12 shows the mechanism and its key steps is listed below:

Step 1. Devices attempts connecting with Application Server forwards ID, passwords, digital certificates, IP/MAC addresses Step 2. Application Server forwards request to an Identity Management (IM) Server (Google CIAM, Okta, Azure AD . . . )

Forward digital certificates. IP/MAC addresses, ID), passwords etc

Step 3. Authentication Server initiates request to RFADL for authentication

Forwards digital certificates, IP/MAC addresses

Step 4. RFADL acquires RF feature tensor from the device

Processes as per FIG. 6, 7, 8 or FIG. 13, 14, 15

Sends the appropriate signal to the Identity Management Server

Step 5. IM uses Multi-Factor Authentication (MFA) which could include sending signal to mobile devices along with ID, Passwords, etc. RFADL authentication could be used as one more factor in MFA or replace certain factors currently in use.

Figure 8:
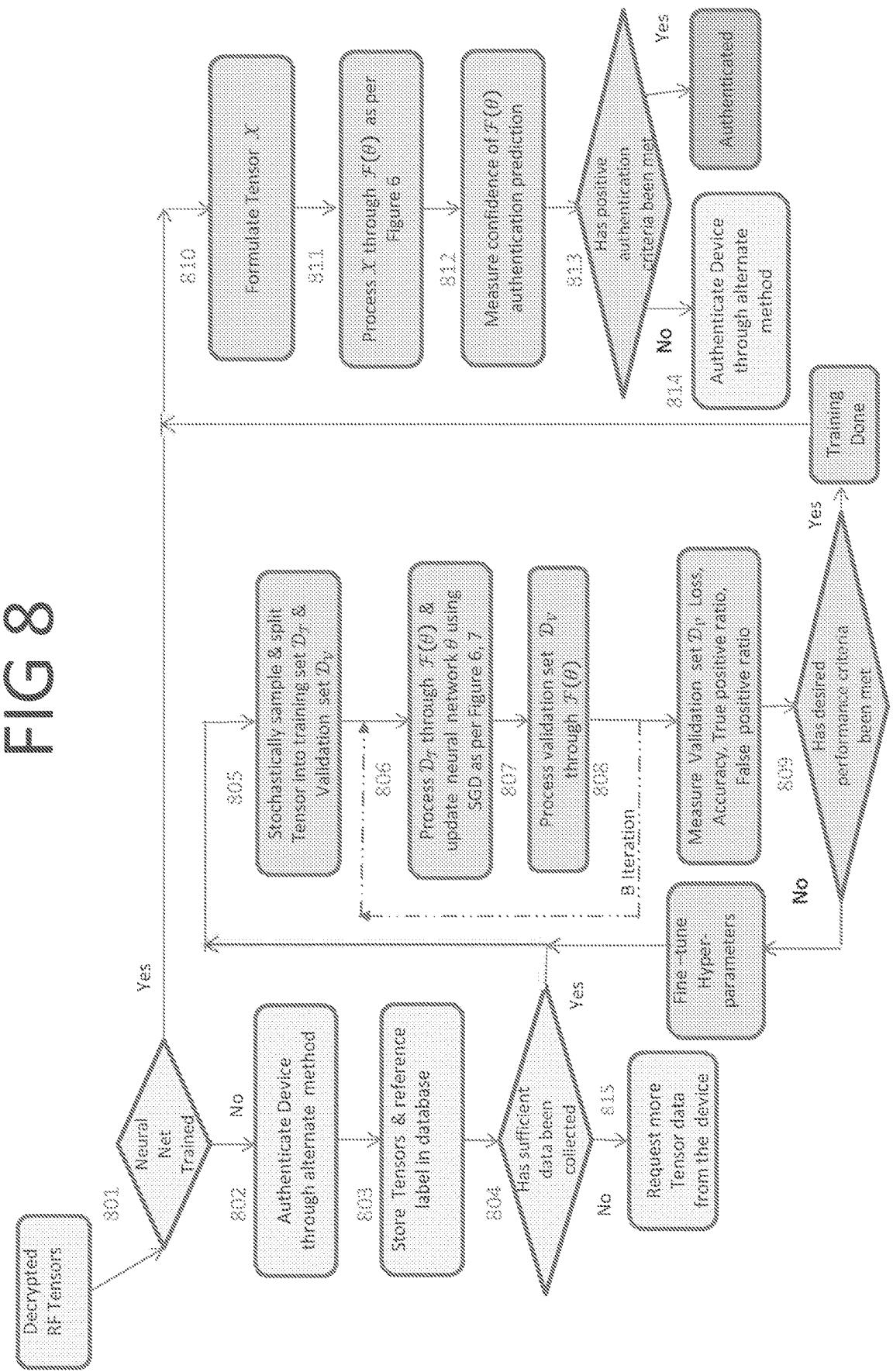
FIG. 8 shows an exemplary flowchart for implementing RFADL described in FIG. 6 and FIG. 7.

Factoring in all the components of MFA, sends final authentication decision to the Application Server An exemplary flowchart of RFADL based on fully connected Neural Networks with Soft-Max classification is described in FIG. 8 is detailed below with a description of each step labeled. Steps 802 to 804 describe pre-training data collection mode, while Steps 805 to 809 describe training mode and Steps 810-814 describe inference mode. Training comprises of 'B' loops to update θ. Each epoch alternates between Training and Validation mode.

Step 801: Receive the encrypted RE Tensor, run it through decryption. First check if the neural network has been trained at all (i.e. first time); if not move to step 802. If neural network has been trained for other device but not for this particular device then move to step 802, otherwise move to step 810 for inference.

Step 802: Authenticate the device through alternate means such as multi-factor authentication as determined by the IT manager. If the device is authenticated through alternate means proceed to step 803 otherwise send this information to the application and the Tensor is added to rogue device set in the database.

Step 803: Once the device has been authenticated then store the RF Tensor $\Gamma_{RF}$ and the associated reference label $Y$ in a secure database to be used for training the deep learning model.

Step 804: There are two scenarios in this mode

1. This mode is invoked for the very first time: The data is collected from various devices over a period of time until sufficient temporal variability of statistics is reflected in collected tensor data in the database. If sufficient data is collected then move step 805 otherwise set a relevant flag to continue accumulating tensor data and move to step 815.

2. This service has been enabled for a first set of devices and a new set of devices are seeking this service: If database already has tensor data for sufficient number of devices as well as sufficient tensor data for this new device seeking this service then move to step 805, otherwise set a relevant flag to continue accumulating tensor data and move to step 815

Step 805: The collected data in the database is split into a stochastically sampled set of tensors $\mathcal{D}_T$ for training the neural networks and a set $\mathcal{D}_V$ for validation.

Step 806: Training set $\mathcal{D}_T$ is processed through neural network $\mathcal{F}(\theta)$ and then updates neural network parameters θ using SGD based back-propagation as described in FIGS. 6 & 7. Each new iteration of this step involves tweaking hyper-parameters.

Step 807: Once neural networks has gone through adaptation then process validation set $\mathcal{D}_V$ through $\mathcal{F}(\theta)$ Step 808: After validation set $\mathcal{D}_V$ has been processed through $\mathcal{F}(\theta)$, measure performance metrics such as Loss, Accuracy, True positive ratio (TPR), False positive ratio (FPR) to determine how well the trained model is performing. Additionally, cutoff criteria are calculated from the evaluated validation data so as to optimize the TPR/FPR. These cutoff criteria are later used in authentication. Iterate step 806 to step 808 'B' times.

Step 809: Check if the desired performance metrics have been met on the validation set $\mathcal{D}_V$. If the performance criterion has been met then the training phases is declared to be over, then move to test/authentication next time when tensor data is received from any of the devices in this set otherwise tune the hyper-parameters and move back to step 805. These hyper-parameters are optimized with a hyper-parameter optimization algorithm.

Step 810: Since the training of the neural networks has been achieved, the algorithm is in inference mode, formulate the tensor X from devices with sufficient samples for detection.

Step 811: Since $\mathcal{F}(\theta)$ is static now, it is called an inference engine. Process the tensor X through $\mathcal{F}(\theta)$ as per FIG. 6 to obtain the probability density estimates for the device Step 812: Measure confidence of $\mathcal{F}(\theta)$ authentication prediction Step 813: Check if positive authentication criteria been met. If the criterion has been met an authentication signal is sent to the application. However, if the criteria is not met then move to step 814.

Step 814: This implies that additional authentication method has to be employed to determine if the device is genuine or it might be an imposter device. If the device is an imposter device then a signal is sent to the application layer and the Tensor is added to rogue device set in the database. However, if this was indeed a valid device then add the tensor data and reference label to the secure database, then move to step 815 to request more tensor data to retrain the neural network for this device.

Step 815: One arrives here from either step 801 or step 814. Request additional tensor data from the devices and update the relevant flags to continue building-up secure tensor database and subsequently train the neural network.

Figure 15:
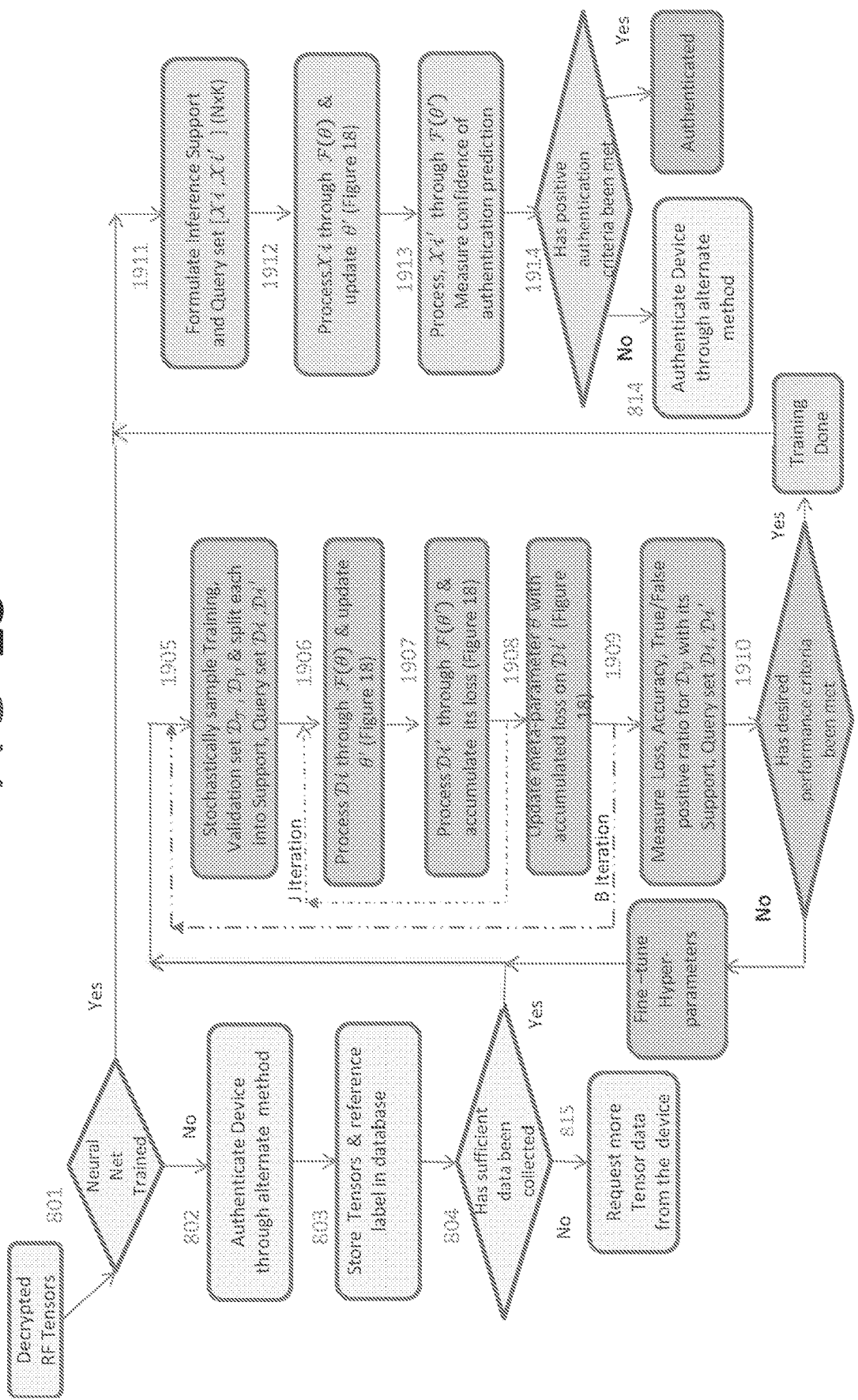
FIG. 15 shows an exemplary flowchart for implementing MAML based RFADL described in FIG. 13 and FIG. 14

An exemplary flowchart of RFADL based on Model Agnostic Meta Learning (MAML) is described in FIG. 15 is detailed below with a description of each step labeled. Steps 802 to 804 describe pre-training data collection mode, while Steps 1905 to 1910 describe meta-training mode and Steps 1910-1914, 814 describe inference mode, MAML training comprises of inner 'J' loops to update θ' and 'B' outer loops to update meta-parameter θ. Each epoch alternates between Training and Validation mode.

Step 801: Receive the encrypted RF Tensor, run it through decryption. Check if the neural network has been trained before, if not move to step 802 for training data collection. If neural network has been trained for other device but not for this particular device then also move to step 802, otherwise move to step 1910 for inference.

Step 802, Step 803: Same as in 'a'.

Step 804: There are two scenarios in this mode

3. This mode is invoked for the very first time: The data is collected from various devices over a period of time until sufficient temporal variability of statistics is reflected in collected tensor data in the database. If sufficient data is collected then move step 1905 otherwise set a relevant flag to continue accumulating tensor data and move to step 815.

4. This service has been enabled for a first set of devices and a new set of devices are seeking this service: If database already has tensor data for sufficient number of devices as well as sufficient tensor data for this new device seeking this service then move to step 1905, otherwise set a relevant flag to continue accumulating tensor data and move to step 815

Step 1905: The collected training data in the database is split into a stochastically sampled Meta-Training set $\mathcal{D}_T$, and Meta-Validation set $\mathcal{D}_V$. During steps 1906-1909 these are stochastically subsampled on the fly to make a Support and a Query set such that $\mathcal{D}_T \ni [\mathcal{D}_{Ti}, \mathcal{D}_{Ti}']$, $\mathcal{D}_V \ni [\mathcal{D}_{Vi}, \mathcal{D}_{Vi}']$ Step 1906: If it is in training mode pick Meta-Training Support set $\mathcal{D}_{Ti}$ or if it is in validation mode, pick the Meta-Validation Support set $\mathcal{D}_{Vi}$. Process the selected Support set through neural network $\mathcal{F}(\theta)$. Then update parameter θ' using SGD on loss derived from $\mathcal{F}(\theta)$ as described in FIG. 14.

Step 1907: If it is in training mode, pick Meta-Training Query set $\mathcal{D}_{Ti}'$ or if it is in validation mode, pick the Meta-Validation Query set $\mathcal{D}_{Ti}'$. Process the selected Query set through neural network $\mathcal{F}(\theta')$ and accumulate its loss for 'J' iterations as described in FIG. 14.

Step 1908: If in training mode, update meta-parameter θ using SGD on accumulated loss in Step 1907 and as described in FIG. 14. Instead if it is in validation mode, θ is left unchanged. Iterate step 1905 to step 1908 'B' times.

Step 1909: Now evaluate the performance metrics for Validation Query set $\mathcal{D}_{Vi}'$ after it has been processed through $\mathcal{F}(\theta')$ as described in steps 1906-1907. Performance metrics such as Loss, Accuracy, True positive ratio (TPR), False positive ratio (FPR) to determine how well the trained model is performing on Validation Query set $\mathcal{D}_{Vi}'$. Additionally, classification threshold parameters are learnt that are used during Inference mode to develop positive authentication criterion.

Step 1910: Check if the desired performance metrics from Step 1909 have met the desired performance thresholds. If the performance criterion has been met then the training phases is declared to be over, then move to test/authentication next time when tensor data is received from any of the devices, otherwise tune the hyper-parameters and move back to step 1905. These hyper-parameters are optimized with a hyper-parameter optimization algorithm.

Step 1911: Since the training of the neural networks has been achieved, the algorithm is in inference mode, then formulate the tensor X with Support and Validation set such that X=[X, $x_i'$]. For N way K shot classification during Inference, Tensor X (N×K) would comprises of the current device seeking authentication and (N−1) devices sampled from (M−1) devices. The Support set X would comprise of K current samples from device seeking authentication, but for its Query set $x_i'$, it could comprise of mixture of current and samples from prior authentication sessions.

Step 1912: In the Inference mode $\mathcal{F}(\theta)$ is static and would be used to process support set X$i$ through it and further used update θ to θ' by using an Stocastic Gradient Decent (SGD) update from the loss derived from $\mathcal{F}(\theta)$, as described in FIG. 14.

Step 1913: Process Query set X$i$' through $\mathcal{F}(\theta')$ with updated θ'. Measure the various performance metrics described in Step 1909-4910 for N×K samples of Query set.

Step 1914: Check if K samples of Query set for the device seeking authentication meet the desired performance threshold along with the performance metrics for ((N−1)×K) Query set samples for the devices not seeking authentication concurrently. If the criterion has been met an authentication signal is sent. However, if the criteria is not met then move to step 814.

Step 814: This implies that additional authentication method has to be employed to determine if the device is genuine or it might be an imposter device. If the device is an imposter device then a signal is sent to the application layer and the Tensor is added to rogue device set in the database. However, if this was indeed a valid device then add the tensor data and reference label to the secure database, then move to step 815 to request ore tensor data to retrain the neural network for this device.

Step 815: One arrives here from either step 801 or step 1914. Request additional tensor data from the devices and update the relevant flags to continue building-up secure tensor database and subsequently train the neural network.

Figure 9:
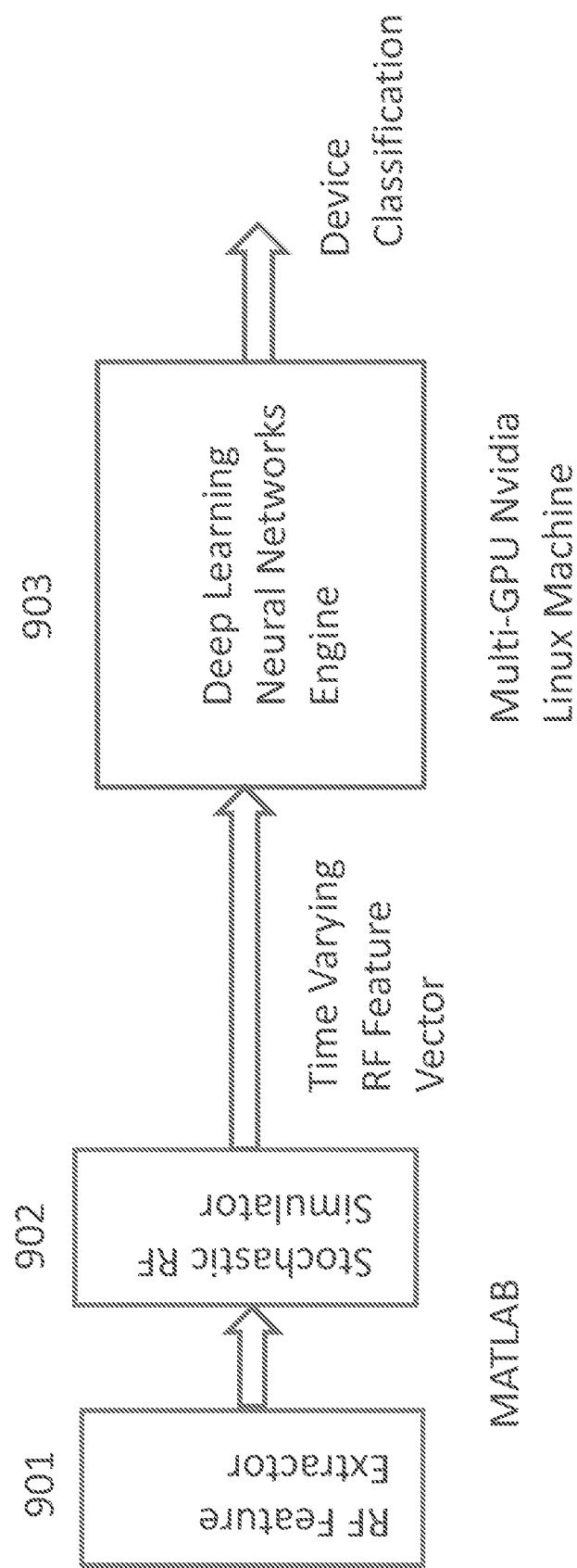
FIG. 9 shows an exemplary software development environment for simulating RFADL.

Simulation results with the exemplary implementations described above are presented herein.

a. Stochastic RE Simulator 901:

RF Simulator designed to get around the problems associated with live RF environments in the lab where RF environments change very slowly or in an unpredictable ways thus making the task of quantifying the performance and enhancing the algorithm very difficult. FIG. 9 depicts RFADL development and testing process. The development work was based on Stochastic RF simulator that simulates a time varying RF environment on Matlab.

Stochastic RF simulator enables testing of RFADL by parameterized control of various RF tensor attributes. The tensor variables that change in unpredictable ways are modeled by sophisticated stochastic process based on time varying Hidden Markov Model (HMM) and some slowly varying variables are modeled by combination of AM, FM modulation. All of the parameters are controlled independently such that all of the hyper-parameters can be fine-tuned and the performance quantified.

b. Deep Learning Simulation 903

Figure 6:
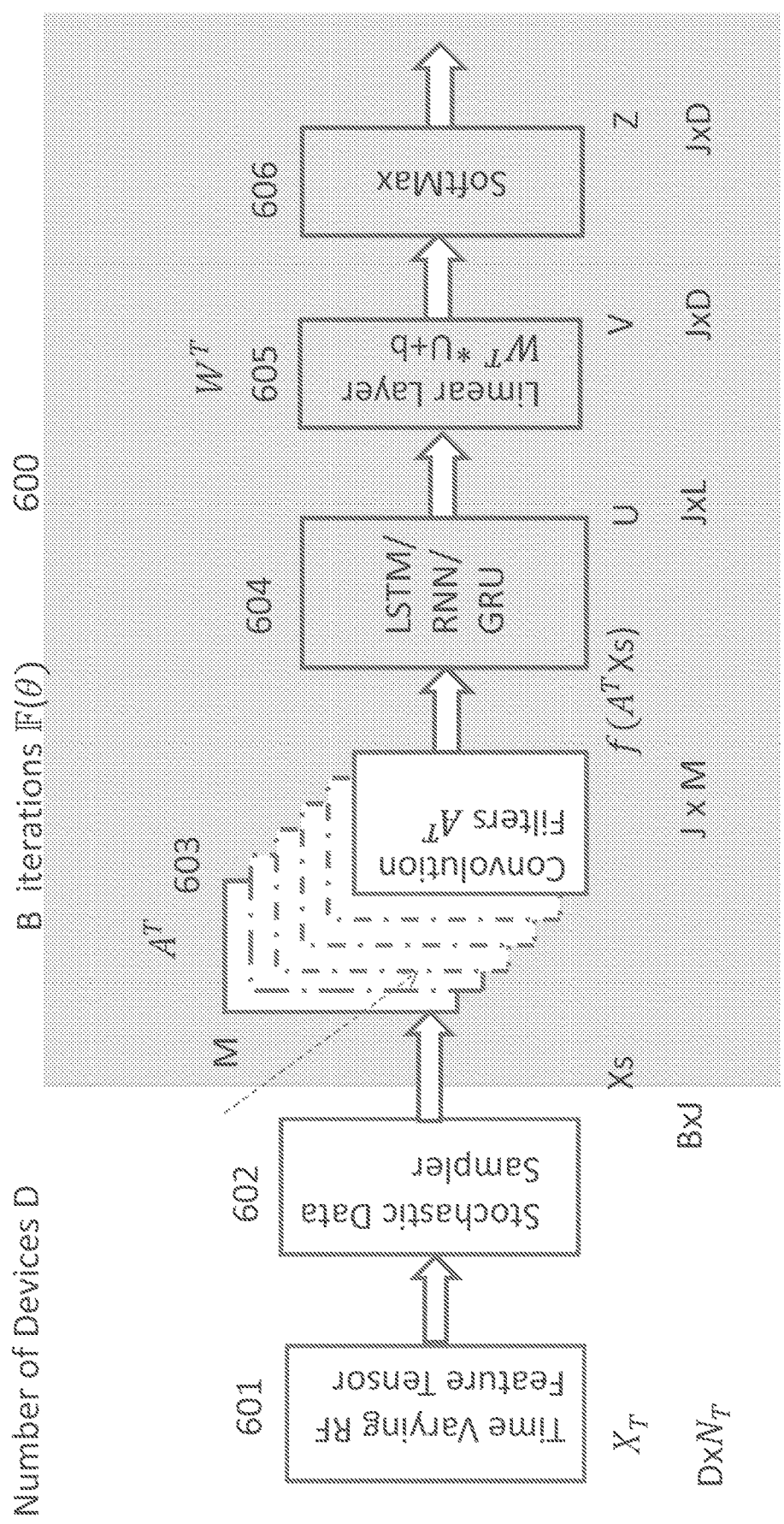
FIG. 6 shows an exemplary implementation of a RFADL based on fully connected Neural Network with Soft-Max based classification.
Figure 11:
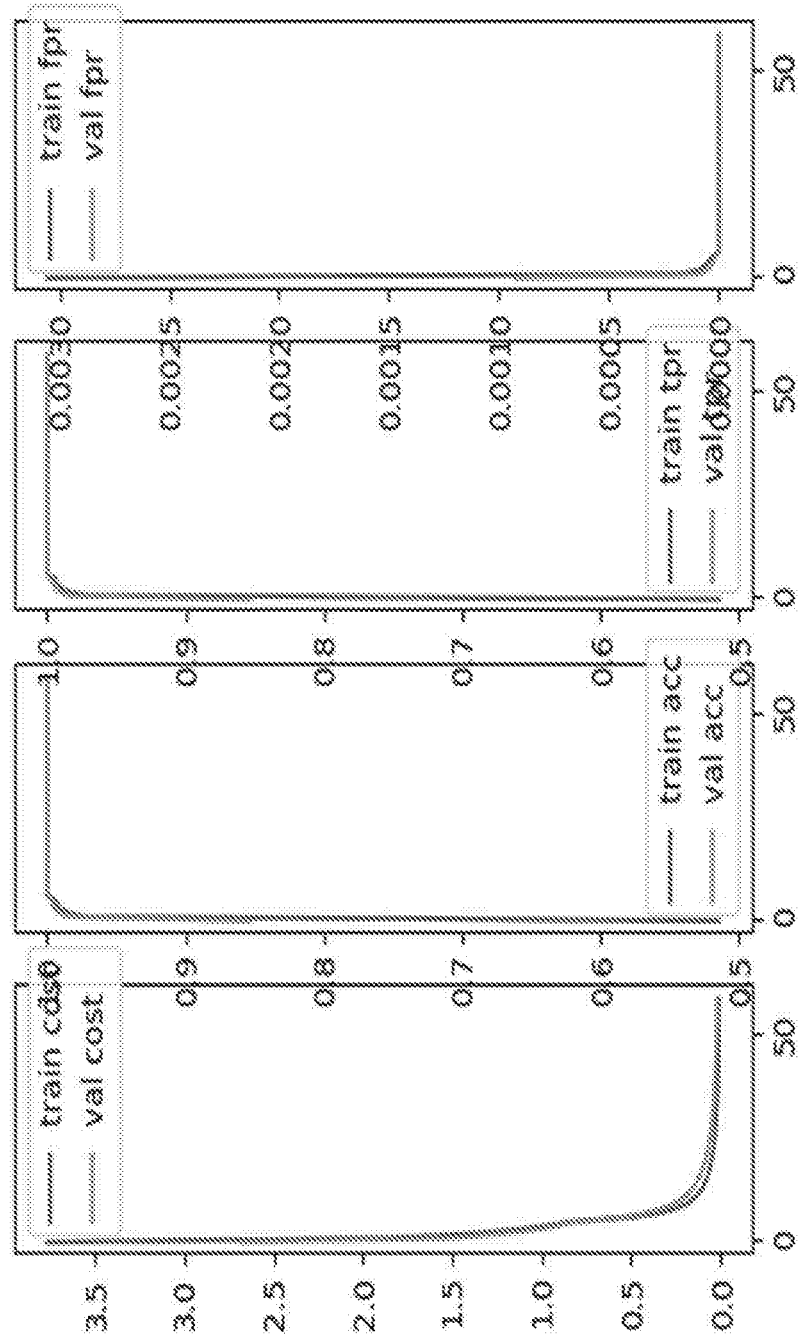
FIG. 11 shows RFADL simulation result for 160 device case with plots of performance metrics of cost, accuracy, true positive ratios, and false positive ratios during training and validation.
Figure 17:
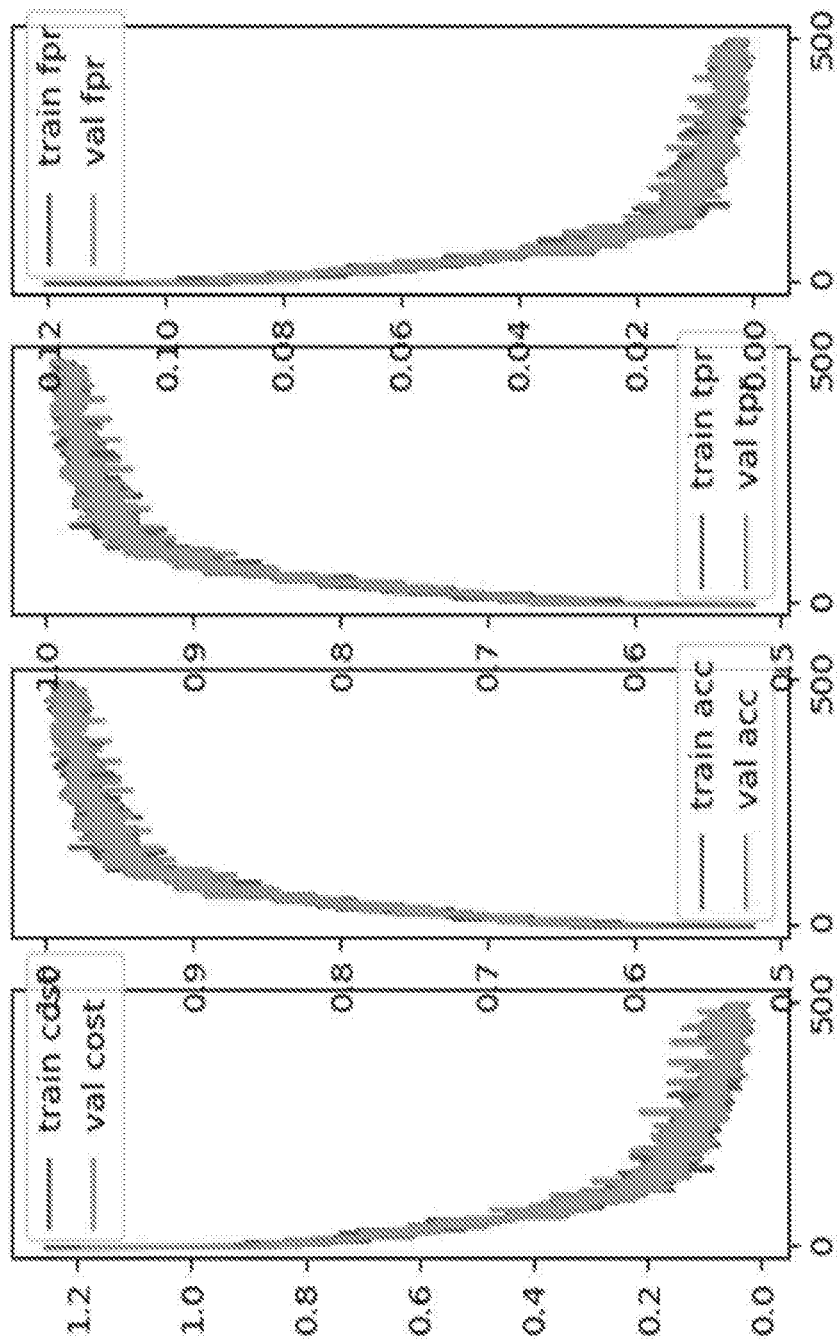
FIG. 17 shows MAML based RFADL simulation result for 160 device case with plots of performance metrics of cost, accuracy, true positive ratios, and false positive ratios during training and validation.

The deep learning engine depicted in FIG. 6 is simulated on a linux PC with dual CPU's. A highly scalable and parameterized code has been written in Tensorflow and Pytorch. The blocks such as convolution filters and linear layer are flexible enough to allow changes in number of filters, size of the filters, weights of linear layer, etc. It implements different kind of recurrent neural networks such LSTM, GRU, Multiplicative LSTM, etc.

e. Simulation Results:
   i. The performance of RFADL with fully connected NN with. Soft-Max classifiers is shown in FIG. 10, 11. FIG. 10 shows a summary of results in a tabular form under various test condition. The first column varies the amount of SNR present in the received signal to show the robustness the algorithm under severe noise of −6 dB to 20 dB. The second column varies the number of wireless devices from 10 to 160 to study the ability of RFADL to distinguish devices as the number of wireless device is increased. The next column shows the performance of different recurrent networks such as LSTM, GRU, etc. The next set of four columns show the performance metric of cost (Loss), accuracy, TPR, FPR during training and the following four during validation. As is evident from the table, the performance of RFADL under varied conditions is very good. FIG. 11 shows a plot of performance curves progression in time for a 160 devices case. Both the training and validation curves meet the expectations of good performance.
   ii. The performance of RFADL with Model Agnostic Meta Learning (MAML) shown in FIG. 16, 17. FIG. 16 shows a summary of results in a tabular form under various test condition as described above in 'i'. The tests are for number of devices ranging from 40 to 160 for a fixed SNR of 6 dB. FIG. 17 shows a plot of performance curves progression in time for a 160 devices case for MAML. Both the training and validation curves meet the expectations of good performance.

The methods and techniques mentioned here of using certain feature vectors and Neural Networks are not limited to just wireless space but is also applicable to wired communications space. In case of a fiber optic communication systems, the high speed optical receivers electrical outputs can be digitized by a high sampling rate ADC's and then certain feature vectors can be extracted from it. Such feature vectors when coupled with Neural Networks described in our document can be used to authenticate the devices connected on that fiber thereby detecting infiltration by a spying device on the network. One can use such systems to also detect deterioration of service on that fiber. Similar techniques can be used for other kind of wired infrastructure such as CAT5/CAT6 Ethernet cable, Coax cable to make data center and core internet infrastructure more secure. The only thing that varies between various wired infrastructure is the signal conversion device to a digital signal and the also the feature vectors used that extract media specific unique features.

The various aspects, implementations or features of the described implementations can be used separately or in any combination without deviating from the spirit of the disclosed teachings. These can be implemented by software, hardware or a combination thereof. The implementations can also be in the form of computer readable code on a computer readable medium to be executed in any type of general or special purpose computing machinery. Examples of the computer readable medium include read-only memory, random-access memory, CD-ROMs, HDDs, DVDs, magnetic tape, and optical data storage devices. The code can also be distributed over network-coupled computer systems so that the computer readable code is stored and executed in a distributed fashion.

While specific nomenclature may have been used in the Specification to provide a thorough understanding of the described implementation, it will be apparent to one skilled in the art that the specific details are not required in order to practice the described teachings. Thus, the descriptions of specific implementations are presented for purposes of illustration and description. They are not intended to be exhaustive or to limit the described implementations to the precise forms disclosed herein. As will be known to a skilled artisan many modifications and variations are possible in view of the above teachings.

The various techniques described herein and/or depicted in the figures may be implemented in, and fully or partially automated by, code modules executed by one or more physical computing systems, hardware computer processors, application-specific circuitry, and/or electronic hardware configured to execute specific and particular computer instructions.

Further application-specific hardware or one or more physical computing devices (utilizing appropriate specialized executable instructions) may be necessary to perform the functionality. These could arise due to the volume or complexity of the calculations involved or to provide results substantially in realtime.

While some exemplary implementations are provided herein, the operations may be rearranged or reordered in other implementations. The separation of various system components in the implementations described should not be understood as requiring such separation in all implementations, and it should be understood that the described program components and systems may generally be integrated together in a single software product or packaged into multiple software products.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A system for authenticating a wireless device comprising:
   an RF feature extractor operable to extract RF features related to a plurality of wireless devices,
   a deep learning engine to learn the RF features and to evaluate RF features related to the plurality of devices
   the RF extractor operable to further receive RF features of a new instance of a specific wireless device from the plurality of devices,
   an analyzer operable to detect a signature for the specific wireless device using the RF characteristics about the new instance using the deep learning engine wherein the RF feature extractor is operable to separate received data into stochastically sampled inference support set and a query set.

2. The system of claim 1, wherein the RF features include device specific RF features and environment specific RF features.

3. The system of claim 2, wherein the device specific RF features include at least one selected from power amplifier non-linearity, timing offset, wavelet analysis vector and automatic gain control.

4. The system of claim 2, wherein the environment specific RF features include at least one selected from RF channel, space time block code, FEC decoder, IP address, MAC address.

5. The system of claim 1, wherein the RF features are represented as real valued RF feature tensors.

6. The system of claim 5, further comprising a homomorphic encryption unit operable to sample and encrypt RF feature tensors prior to processing by the deep learning engine.

7. The system of claim 1, wherein the deep learning engine runs in cloud.

8. The system of claim 1 wherein the deep learning engine runs locally.

9. The system of claim 1, wherein the deep learning engine is a fully connected Neural Network.

10. The system of claim 1, wherein the deep learning system is a model agnostic meta-learning system.

11. The system of claim 1, further comprising an authentication server through which an application server communicates with the deep learning engine
wherein an authentication function using the deep learning engine is integrated with other authentication functions in the authentication server.

12. The system of claim 1, wherein the deep learning engine directly communicates with an application server.

13. The system of claim 1, wherein the deep learning engine is located locally.

14. The system of claim 1, wherein an authentication function is integrated into commercially available identity management systems.

15. The system of claim 1, further comprising a configurable wireless architecture that enable authentication of wireless devices.

16. The system of claim 15, the configurable wireless architecture comprises a configurable RF frontend and a configurable baseband DSP.

17. The system of claim 16, wherein the configurable RF frontend further comprises a transmit RF frontend and receiver RF frontend.

18. The system of claim 17, wherein the transmit RF frontend comprises
a digitally synthesized RF oscillator,
an RF mixer and
a power amplifier.

19. The system of claim 18, wherein the receiver RF frontend comprises
a low noise amplifier
a digitally synthesized RF oscillator
an RF mixer and
a source acoustic filter.

20. The system of claim 15, wherein the configurable baseband DSP further comprises a transmit baseband DSP and a receiver baseband DSP.

21. The system of claim 20, wherein the transmit baseband DSP further comprises:
a configurable FEC code a configurable IFFT
a configurable space time block coder
a configurable transmit digital RF.

22. The system of claim 21, wherein the receiver baseband DSP further comprises:
a configurable receiver digital RF
a configurable space time block decoder
a configurable EFT
a configurable equalizer
a configurable FEC decoder.

23. The system of claim 1, wherein the deep learning engine is a fully connected neural network with soft-max based system.

24. The system of claim 1, wherein the deep learning engine is a model agnostic meta-learning based system.

25. The system of claim 1 wherein the deep learning engine is operable to process the inference support set and update the deep learning neural net based a loss derived from the deep learning neural net using a stochastic gradient descent and further operable to process the query set using updated deep learning neural net.

26. A method of authenticating a wireless device comprising
a. receiving a tensor with RF features related to the device;
b. processing the tensor through a trained deep learning neural net engine to receive an authentication prediction;
c. measuring a confidence level of the prediction; and
d. designating the authentication device as authenticated if the confidence level reaches a threshold
wherein the deep learning neural net is trained using a method comprising:
aa) receiving a data set of RF tensors from the wireless device;
bb) stochastically sampling the data set in training sets and validation set;
cc) processing the training set through the deep learning neural net;
dd) processing the validation set through the deep learning neural net;
ee) measuring validation set loss, accuracy, true positive ratio and false positive ratio; and
ff) repeating steps cc-ff till a desired performance criteria is met.

27. The method of claim 26, wherein the RF features include device specific RF features
and environment specific RF features.

28. The method of claim 27, wherein the device specific RF features include at least one selected from power amplifier non-linearity, carrier offset, timing offset, wavelet analysis vector and automatic gain control.

29. The method of claim 26, wherein the RF features are represented as real valued RF feature tensors.

30. The method of claim 26, wherein in step b the received data set is separated into stochastically sampled inference support set and a query set.

31. The method of claim 30, wherein the inference support set is processed through the deep learning engine, a loss is computed, the deep learning neural net is updated based on the loss using a stochastic gradient descent and the query set is processed through the updated deep learning neural net.

32. The method of claim 26, wherein in step b, the data is separated into inference support set and query set.

33. The method of claim 32, wherein in steps cc-dd, the method comprises:

i. processing a support data set,
ii. generating a modified meta-parameter using a stochastic gradient descent,
iii. processing a query data set using the modified meta-parameter using results of step iii to update the meta-parameter.

34. The method of claim 26, wherein in step ee, inference support set and query sets are used.

* * * * *